(12) United States Patent
Rowe

(10) Patent No.: US 11,670,819 B2
(45) Date of Patent: Jun. 6, 2023

(54) BATTERY PACK INCLUDING STAGGERED BATTERY PACK TERMINALS

(71) Applicant: TECHTRONIC CORDLESS GP, Anderson, SC (US)

(72) Inventor: Tyler J. Rowe, Anderson, SC (US)

(73) Assignee: Techtronic Cordless GP, Anderson, SC (US)

(*) Notice: Subject to any disclaimer, the term of this patent is extended or adjusted under 35 U.S.C. 154(b) by 93 days.

(21) Appl. No.: 16/536,419

(22) Filed: Aug. 9, 2019

(65) Prior Publication Data
US 2021/0043892 A1   Feb. 11, 2021

(51) Int. Cl.
| | |
|---|---|
| H01M 50/213 | (2021.01) |
| B25F 5/02 | (2006.01) |
| H02J 7/00 | (2006.01) |
| H01M 10/48 | (2006.01) |
| H01M 50/296 | (2021.01) |

(52) U.S. Cl.
CPC ............ H01M 50/213 (2021.01); B25F 5/02 (2013.01); H01M 10/48 (2013.01); H01M 50/296 (2021.01); H02J 7/0044 (2013.01); H01M 2220/30 (2013.01)

(58) Field of Classification Search
CPC ............ H01M 50/213; H01M 50/543; H01M 2220/30; H01M 10/0587; H01M 10/48; H01M 10/0525; B25F 5/02; H02J 7/0044; Y02E 60/10
See application file for complete search history.

(56) References Cited

U.S. PATENT DOCUMENTS

| | | |
|---|---|---|
| 6,274,266 B1 | 8/2001 | Wang |
| D512,961 S | 12/2005 | Okuda et al. |
| 7,491,466 B2 | 2/2009 | Feddrix et al. |
| (Continued) | | |

FOREIGN PATENT DOCUMENTS

| | | |
|---|---|---|
| CN | 302042904 S | 8/2012 |
| CN | 305080827 S | 3/2019 |
| (Continued) | | |

OTHER PUBLICATIONS

Extended European Search Report for Application No. 20190318.4 dated Dec. 11, 2020 (8 pages).
(Continued)

*Primary Examiner* — Michael L Dignan
(74) *Attorney, Agent, or Firm* — Michael Best & Friedrich LLP

(57) ABSTRACT

A battery pack that includes a housing. The housing includes a support portion that is configured to removably connect to a device, such as a cordless, hand-held power tool. The battery pack is configured to electrically and/or communicatively connect to the device through at least one terminal. The at least one terminal can include a battery positive power terminal, a battery negative power terminal, and a communications terminal. In some embodiments, at least one of the terminals of the battery pack is positioned at a first depth level within the support portion and at least one of the terminals of the battery pack is positioned at a second depth level within the support portion. The battery pack includes a first distance between the first depth level and the second depth level (e.g., approximately 0.5 inches).

14 Claims, 18 Drawing Sheets

(56) References Cited

U.S. PATENT DOCUMENTS

| | | |
|---|---|---|
| 7,588,471 B2 | 9/2009 | Rejman |
| 7,618,741 B2 | 11/2009 | Casalena et al. |
| 7,648,402 B2 | 1/2010 | Rejman |
| 7,688,028 B2 | 3/2010 | Phillips et al. |
| 7,723,952 B2 | 5/2010 | Phillips et al. |
| 7,777,448 B2 | 8/2010 | Beghelli |
| 7,868,591 B2 | 1/2011 | Phillips et al. |
| D633,036 S | 2/2011 | Murray |
| D640,190 S | 6/2011 | Aglassinger |
| D643,809 S | 8/2011 | Okuda et al. |
| D657,307 S | 4/2012 | Zhao |
| D682,194 S | 5/2013 | Jiang et al. |
| D684,528 S | 6/2013 | Murray |
| D698,312 S | 1/2014 | Miller |
| 8,691,411 B2 | 4/2014 | Takahashi et al. |
| 8,728,656 B2 | 5/2014 | Takahashi et al. |
| D712,826 S | 9/2014 | Marino et al. |
| 8,974,933 B2 | 3/2015 | Krishnamurthi et al. |
| 9,023,514 B2 | 5/2015 | Tatehata et al. |
| 9,112,292 B2 | 8/2015 | Ogura |
| 9,172,115 B2 | 10/2015 | Kolden et al. |
| D748,577 S | 2/2016 | Marino et al. |
| D770,377 S | 11/2016 | Kondo |
| 9,484,756 B2 | 11/2016 | Su et al. |
| 9,508,977 B2 | 11/2016 | Tatehata et al. |
| D785,562 S | 5/2017 | Cooper |
| D790,307 S | 6/2017 | Marino et al. |
| 9,685,682 B2 | 6/2017 | Hoshi et al. |
| D800,062 S | 10/2017 | Rowe et al. |
| D800,656 S | 10/2017 | Marino et al. |
| 9,793,534 B2 | 10/2017 | Takahashi et al. |
| D801,916 S | 11/2017 | Altenburger et al. |
| D801,917 S | 11/2017 | Jiang |
| 9,825,263 B2 | 11/2017 | Tatehata et al. |
| D826,149 S | 8/2018 | Cooper |
| D826,150 S | 8/2018 | Cayon |
| D884,601 S | 5/2020 | Zhou |
| 2004/0196599 A1 | 10/2004 | Kim |
| 2006/0087283 A1 | 4/2006 | Phillips et al. |
| 2006/0087284 A1 | 4/2006 | Phillips et al. |
| 2006/0087285 A1 | 4/2006 | Phillips et al. |
| 2006/0087286 A1 | 4/2006 | Phillips et al. |
| 2006/0275656 A1 | 12/2006 | Feddrix et al. |
| 2007/0273330 A1 | 11/2007 | Beghelli |
| 2008/0003494 A1 | 1/2008 | Rejman |
| 2008/0084181 A1 | 4/2008 | Griffin |
| 2009/0186262 A1 | 7/2009 | Takahashi et al. |
| 2009/0197161 A1 | 8/2009 | Nakamura |
| 2009/0202896 A1 | 8/2009 | Rejman |
| 2009/0246608 A1 | 10/2009 | Wu et al. |
| 2010/0141207 A1 | 6/2010 | Phillips et al. |
| 2010/0209751 A1 | 8/2010 | Matthias et al. |
| 2011/0133496 A1 | 6/2011 | Cooper |
| 2012/0045667 A1* | 2/2012 | Yoneda ............... H01M 50/216 429/7 |
| 2012/0052337 A1 | 3/2012 | Krishnamurthi et al. |
| 2012/0237801 A1 | 9/2012 | Tatehata et al. |
| 2013/0008682 A1 | 1/2013 | Turner et al. |
| 2013/0052502 A1 | 2/2013 | Su et al. |
| 2013/0244504 A1* | 9/2013 | Ogura ................. H01R 13/113 439/759 |
| 2014/0030563 A1 | 1/2014 | Hoshi et al. |
| 2014/0037993 A1 | 2/2014 | Takahashi et al. |
| 2014/0248530 A1 | 9/2014 | Takahashi et al. |
| 2014/0266071 A1 | 9/2014 | Tomiyasu et al. |
| 2014/0272516 A1 | 9/2014 | Tennison et al. |
| 2014/0302353 A1* | 10/2014 | Ogura ................. H01M 50/213 429/7 |
| 2014/0349143 A1 | 11/2014 | Ogura et al. |
| 2015/0263327 A1 | 9/2015 | Tatehata et al. |
| 2015/0357683 A1 | 12/2015 | Lohr et al. |
| 2015/0367497 A1 | 12/2015 | Ito et al. |
| 2016/0240901 A1 | 8/2016 | Kondo |
| 2016/0241065 A1* | 8/2016 | Kondo ................ H01M 50/543 |
| 2017/0040574 A1 | 2/2017 | Tatehata et al. |
| 2018/0040927 A1 | 2/2018 | Rejman et al. |
| 2018/0055324 A1 | 3/2018 | Hwang et al. |
| 2018/0277801 A1* | 9/2018 | Brozek ............... H01M 10/441 |
| 2020/0052257 A1 | 2/2020 | Stanton et al. |
| 2020/0139531 A1 | 5/2020 | Zahn et al. |

FOREIGN PATENT DOCUMENTS

| | | |
|---|---|---|
| EM | 004682623-0001 | 1/2018 |
| JP | 1282585 S | 10/2006 |
| JP | 1283335 S | 10/2006 |
| JP | 1413656 S | 5/2011 |
| JP | 1414124 S | 5/2011 |
| JP | 1433483 S | 2/2012 |
| JP | 1566388 S | 1/2017 |
| JP | 1581410 S | 7/2017 |
| JP | 1639514 S | 8/2019 |
| JP | 1639646 S | 8/2019 |
| JP | 1658289 S | 4/2020 |
| JP | 1660892 S | 6/2020 |
| JP | 1660893 S | 6/2020 |
| KR | 300599097 S | 5/2011 |
| TW | D197451 S | 5/2019 |
| WO | 9323888 A1 | 11/1993 |
| WO | 2018079722 A1 | 5/2018 |

OTHER PUBLICATIONS

Stone et al., "A Modular Design Approach to Support Sustainable Design," ASME 2004 Design Engineering Technical Conference, © 2004, 10 pages.

* cited by examiner

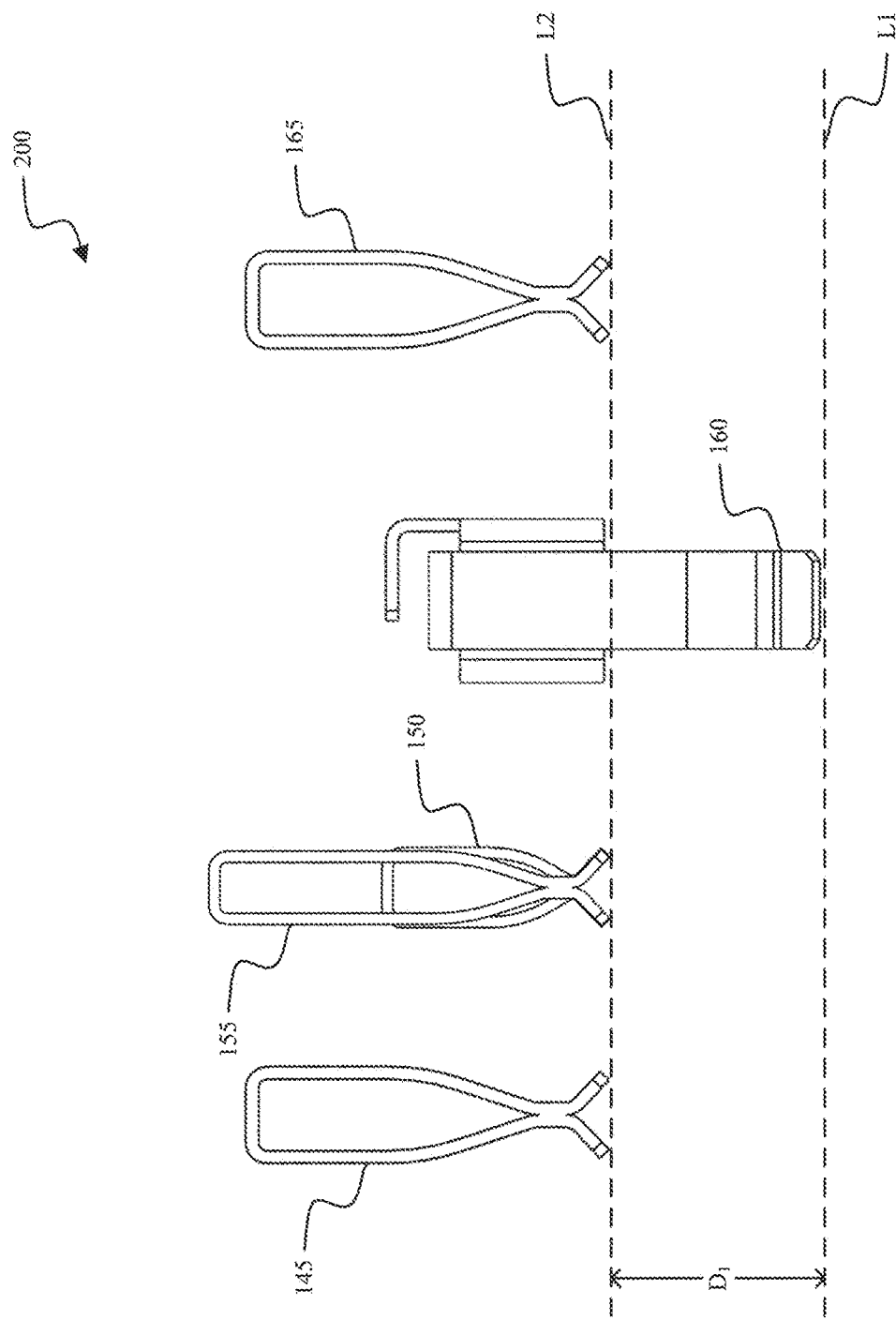

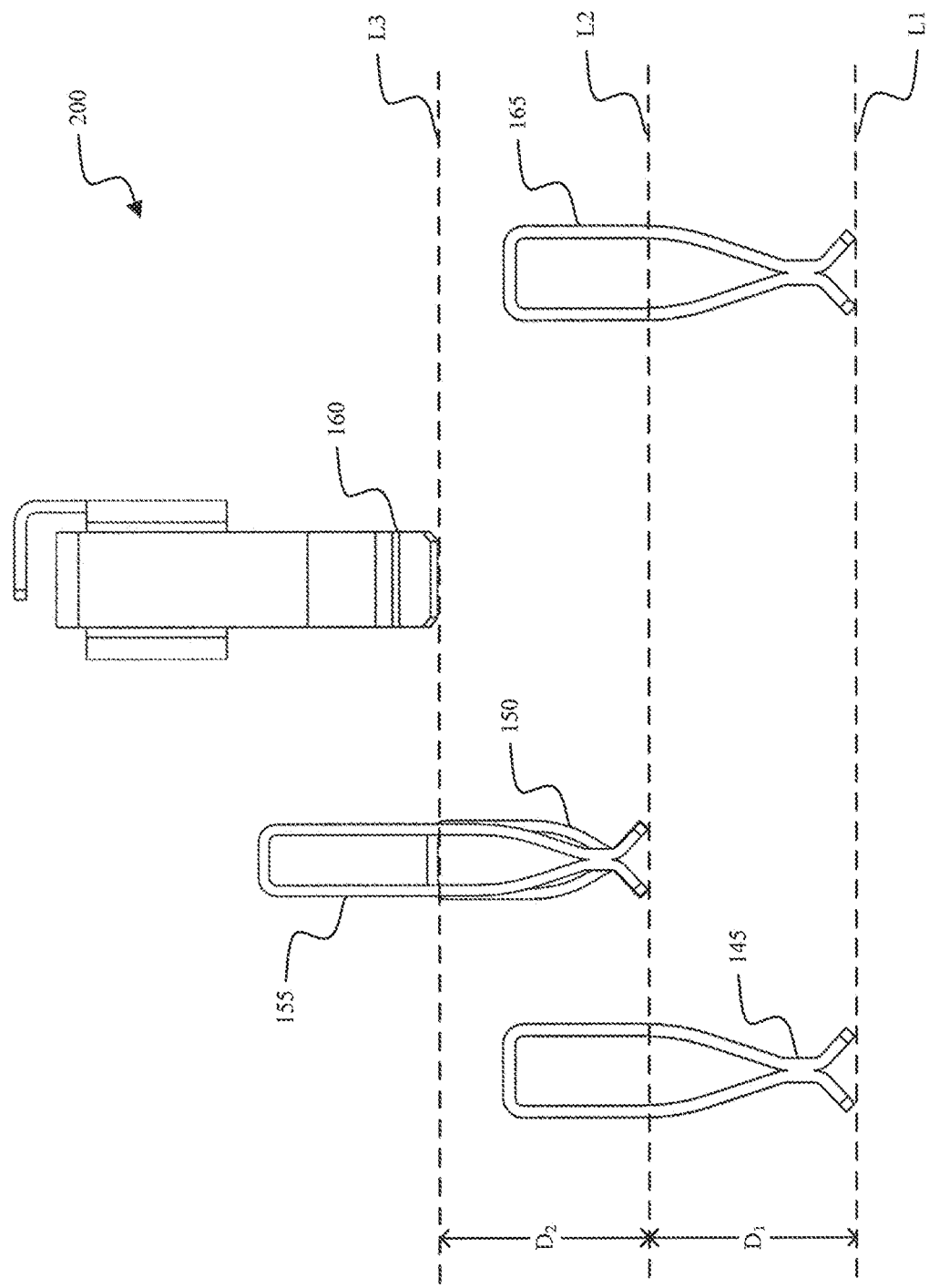

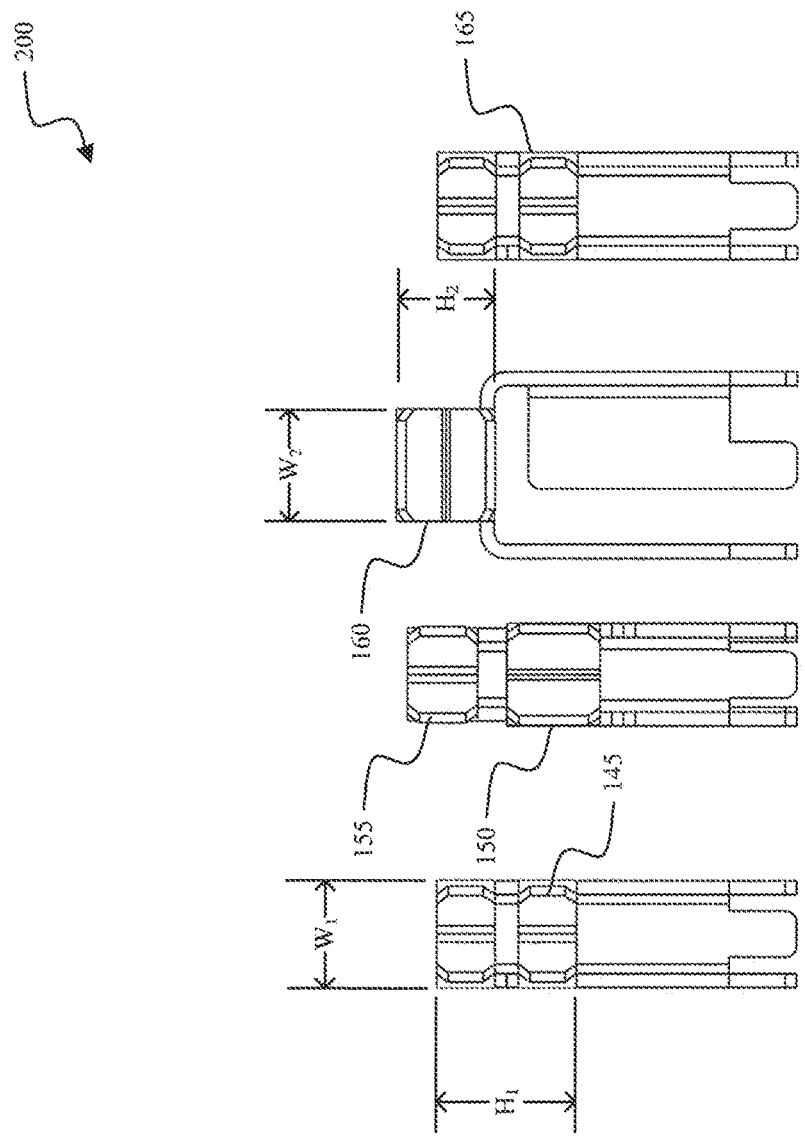

BATTERY PACK INCLUDING STAGGERED BATTERY PACK TERMINALS

FIELD

Embodiments described herein relate to a battery pack for powering a device.

SUMMARY

Embodiments described herein provide a battery pack that includes a housing. The housing includes a support portion that is configured to removably connect to a device, such as a cordless, hand-held power tool. The battery pack is configured to electrically and/or communicatively connect to the device through at least one terminal. The at least one terminal can include a battery positive power terminal, a battery negative power (or ground) terminal, and a communications terminal. In some embodiments, at least one of the terminals of the battery pack is positioned at a first depth level within the support portion and at least one of the terminals of the battery pack is positioned at a second depth level within the support portion. The battery pack includes a first distance (e.g., approximately 0.5 inches) between the first depth level and the second depth level. By varying the depth level of the terminals of the battery pack in the support portion, the relative depth of the terminals function as a keying mechanism that limits the manner in which devices can connect to the battery pack.

Embodiments described herein provide a battery pack that includes a housing, a plurality of battery cells located within the housing, a first battery pack terminal, and a second battery pack terminal. The housing includes a battery pack support portion configured to removably mechanically connect the battery pack to a device. The battery pack support portion includes a first rail, a second rail, and a coupling mechanism for securing the battery pack to the device. The first battery pack terminal is configured to electrically connect the battery pack to the device. The first battery pack terminal is located at a first depth level within the battery pack support portion. The second battery pack terminal is configured to electrically connect the battery pack to the device. The second battery pack terminal is located at a second depth level within the battery pack support portion, and there is a first distance between the first depth level of the battery pack support portion and the second depth level of the battery pack support portion.

In some embodiments, the first battery pack terminal is a first battery pack power terminal and the second battery pack terminal is a second battery pack power terminal. In some embodiments, the first distance between the first depth level of the battery pack support portion and the second depth level of the battery pack support portion is in the range of 0.3 to 0.7 inches. In some embodiments, the first distance between the first depth level of the battery pack support portion and the second depth level of the battery pack support portion is 0.5 inches. In some embodiments, the first battery pack power terminal is a battery negative power terminal, and the second battery pack terminal is a charging terminal. In some embodiments, the first battery pack power terminal and the second battery pack terminal are configured to electrically connect the battery pack to an interface of the device. In some embodiments, the battery pack further includes a third battery pack signal terminal configured to electrically connect the battery pack to the device, the third battery pack signal terminal located at the second depth level of the battery pack support portion. In some embodiments, the battery pack further includes a fourth battery pack power terminal configured to electrically connect the battery pack to the device, the fourth battery pack power terminal located at the first depth level of the battery pack support portion. In some embodiments, the first battery pack power terminal, the third battery pack signal terminal and the fourth battery pack power terminal are configured to electrically connect the battery pack to an interface of the device. In some embodiments, the battery pack further includes a third battery pack power terminal configured to electrically connect the battery pack to the device, the third battery pack power terminal located at a third depth level of the battery pack support portion. In some embodiments, there is a second distance between the second depth level and the third depth level. In some embodiments, the first battery pack power terminal and the third battery pack power terminal are configured to electrically connect the battery pack to an interface of the device. In some embodiments, the battery pack further includes a fourth battery pack power terminal configured to electrically connect the battery pack to an interface of the device, the fourth battery pack power terminal being located at the first depth level of the battery pack support portion. In some embodiments, the first battery pack power terminal, the second battery pack terminal and the fourth battery pack power terminal are configured to electrically connect the battery pack to an interface of the device.

Embodiments described herein provide a battery pack that includes a housing, a plurality of battery cells located within the housing, a first battery pack terminal, and a second battery pack terminal. The housing includes a battery pack support portion configured to removably mechanically connect the battery pack to a device. The battery pack support portion includes a first rail, a second rail, and a coupling mechanism for securing the battery pack to the device. The battery pack support portion has a first depth level and a second depth level. The first depth level and the second depth level are separated by a first distance. The first battery pack terminal is configured to electrically connect the battery pack to the device. The first battery pack terminal is located at the second depth level of the battery pack support portion. The second battery pack terminal is configured to electrically connect the battery pack to the device. The second battery pack terminal is also located at the second depth level of the battery pack support portion.

In some embodiments, the first battery pack terminal is a first battery pack power terminal, and the second battery pack terminal is a second battery pack power terminal. In some embodiments, the first distance between the first depth level of the battery pack support portion and the second depth level of the battery pack support portion is in the range of 0.3 to 0.7 inches. In some embodiments, the first distance between the first depth level of the battery pack support portion and the second depth level of the battery pack support portion is 0.5 inches. In some embodiments, the battery pack further includes a third battery pack terminal configured to electrically connect the battery pack to the device, the third battery pack terminal located at the first depth level of the battery pack support portion. In some embodiments, the first battery pack terminal is a charging terminal, the second battery pack terminal is a communication terminal, and the third battery pack terminal is a battery negative power terminal. In some embodiments, the battery pack further includes a fourth battery pack terminal configured to electrically connect the battery pack to the device, the fourth battery pack terminal located at the first depth level of the battery pack support portion. In some embodiments, the battery pack support portion includes a third depth level, the second depth level and the third depth level separated by a second distance. In some embodiments, the battery pack further includes a third battery pack terminal configured to electrically connect the battery pack to the device, the third battery pack terminal located at the third depth level of the battery pack support portion. In some embodiments, the battery pack further includes a fourth battery pack terminal configured to electrically connect the battery pack to the device, the fourth battery pack terminal located at the first depth level of the battery pack support portion.

Embodiments described herein provide a battery pack that includes a housing, a plurality of battery cells located within the housing, a first battery pack terminal, and a second battery pack terminal. The housing includes a battery pack support portion configured to removably mechanically connect the battery pack to a device. The battery pack support portion includes a first depth level and a second depth level. The first depth level and the second depth level are separated by a first distance. The first battery pack terminal is configured to electrically connect the battery pack to the device. The first battery pack terminal is located at the first depth level of the battery pack support portion. The second battery pack terminal is configured to electrically connect the battery pack to the device. The second battery pack terminal is located at the second depth level of the battery pack support portion.

In some embodiments, the first battery pack terminal is a first battery pack power terminal and the second battery pack terminal is a second battery pack power terminal. In some embodiments, the first distance between the first depth level of the battery pack support portion and the second depth level of the battery pack support portion is in the range of 0.3 to 0.7 inches. In some embodiments, the first distance between the first depth level of the battery pack support portion and the second depth level of the battery pack support portion is 0.5 inches. In some embodiments, the first battery pack power terminal is a battery negative power terminal, and the second battery pack terminal is a charging terminal. In some embodiments, the battery pack further includes a third battery pack signal terminal configured to electrically connect the battery pack to the device, the third battery pack signal terminal located at the second depth level of the battery pack support portion. In some embodiments, the battery pack further includes a fourth battery pack power terminal configured to electrically connect the battery pack to the device, the fourth battery pack power terminal located at the first depth level of the battery pack support portion. In some embodiments, the battery pack support portion includes a third depth level, the second depth level and the third depth level separated by a second distance. In some embodiments, the battery pack further includes a third battery pack power terminal configured to electrically connect the battery pack to the device, the third battery pack power terminal located at a the third depth level of the battery pack support portion. In some embodiments, the battery pack further includes a fourth battery pack power terminal configured to electrically connect the battery pack to the device, the fourth battery pack power terminal located at the first depth level of the battery pack support portion.

Embodiments described herein provide a battery pack that includes a housing including a battery pack support portion configured to removably mechanically connect the battery pack to a device, the battery pack support portion including a first rail, a second rail, and a coupling mechanism for securing the battery pack to the device, a plurality of battery cells located within the housing, a first battery pack power terminal configured to electrically connect the battery pack to the device, and a second battery pack power terminal configured to electrically connect the battery pack to the device. The first battery pack power terminal has a first height and a first width, the first height being greater than the first width to produce a vertical orientation with respect to the battery pack. The second battery pack power terminal has a second height and a second width, the second height being less than the second width to produce a horizontal orientation with respect to the battery pack.

In some embodiments, the first battery pack power terminal has at least one pair of female blade terminals, and the second battery pack power terminal has a pair of female blade terminals, a plane where the pair of female blade terminals of the first battery pack power terminal is substantially orthogonal to a support surface of the support portion, and a plane where the pair of female blade terminals of the second battery pack power terminal is substantially parallel to the support surface of the support portion. In some embodiments, the first battery pack power terminal is a battery negative power terminal, and the second battery pack power terminal is a power receiving terminal and/or a power supplying terminal. In some embodiments, the first battery pack power terminal includes two pairs of female blade terminals. In some embodiments, the second battery pack power terminal includes a single pair of female blade terminals. In some embodiments, the battery pack further includes a third battery pack power terminal configured to electrically connect the battery pack to the device, the third battery pack power terminal having a third height and a third width, the third height being greater than the third width to produce a vertical orientation with respect to the battery pack. In some embodiments, the third battery pack power terminal includes a single pair of female blade terminals. In some embodiments, a plane where the pair of female blade terminals of the second battery pack power meet each other is spaced apart from a support surface of the support portion by a distance within the range of H1a to H1b.

Embodiments described herein provide a battery pack that includes a housing including a battery pack support portion configured to removably mechanically connect the battery pack to a device, the battery pack support portion including a first rail, a second rail, and a coupling mechanism for securing the battery pack to the device, a plurality of battery cells located within the housing, a first battery pack power terminal configured to electrically connect the battery pack to the device, and a second battery pack power terminal configured to electrically connect the battery pack to the device. The first battery pack power terminal has a first terminal orientation and the second battery pack power terminal has a second terminal orientation. The first terminal orientation is approximately orthogonal to the second terminal orientation.

In some embodiments, the first terminal orientation is a vertical orientation with respect to the battery pack. In some embodiments, the first battery pack power terminal includes a first height and a first width, the first height being greater than the first width. In some embodiments, the first battery pack power terminal includes two pairs of female blade terminals. In some embodiments, the second battery pack power terminal includes a single pair of female blade terminals. In some embodiments, the first terminal orientation is a horizontal orientation with respect to the battery pack. In some embodiments, the first battery pack power terminal includes a first height and a first width, the first height being less than the first width. In some embodiments, the battery pack further includes a third battery pack power terminal configured to electrically connect the battery pack to the device, the third battery pack power terminal having the second terminal orientation.

Embodiments described herein provide a battery pack that includes a housing including a battery pack support portion configured to removably mechanically connect the battery pack to a device, the battery pack support portion including a first rail, a second rail, and a coupling mechanism for securing the battery pack to the device, a plurality of battery cells located within the housing, a first battery pack power terminal configured to electrically connect the battery pack to the device, and a second battery pack power terminal configured to electrically connect the battery pack to the device. The first battery pack power terminal has a first terminal orientation. The second battery pack power terminal has a second terminal orientation. The first terminal orientation is different than the second terminal orientation.

In some embodiments, the first terminal orientation is a vertical orientation with respect to the battery pack. In some embodiments, the first battery pack power terminal includes a first height and a first width, the first height being greater than the first width. In some embodiments, the first terminal orientation is a horizontal orientation with respect to the battery pack. In some embodiments, the first battery pack power terminal includes a first height and a first width, the first height being less than the first width. In some embodiments, the battery pack further includes a third battery pack power terminal configured to electrically connect the battery pack to the device, the third battery pack power terminal having the first terminal orientation.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIG. 18 illustrates terminals of the battery pack of FIG. 1 at staggered depth levels, according to embodiments described herein.

FIG. 19 illustrates terminals of the battery pack of FIG. 1 at staggered depth levels, according to embodiments described herein.

FIG. 20 is a front view of the terminal assembly of FIG. 14.

DETAILED DESCRIPTION

Embodiments described herein provide a battery pack for powering any one of a variety of different devices. The battery pack physically and mechanically connects to the devices through a support portion of the battery pack (e.g., a mating interface). The battery pack powers the devices by electrically connecting to the device using at least one terminal. For example, the battery pack electrically connects to the device using a battery pack positive power terminal and a battery pack negative power terminal. The terminals used to connect the battery pack to the device can be staggered at different depths within the support portion of the battery pack. For example, a first terminal of the battery pack can be positioned at a first depth level within the support portion. A second terminal of the battery pack can be positioned at a second depth level within the support portion. The battery pack includes a distance between the first depth level and the second depth level within the support portion of the battery pack.

Figure 1:
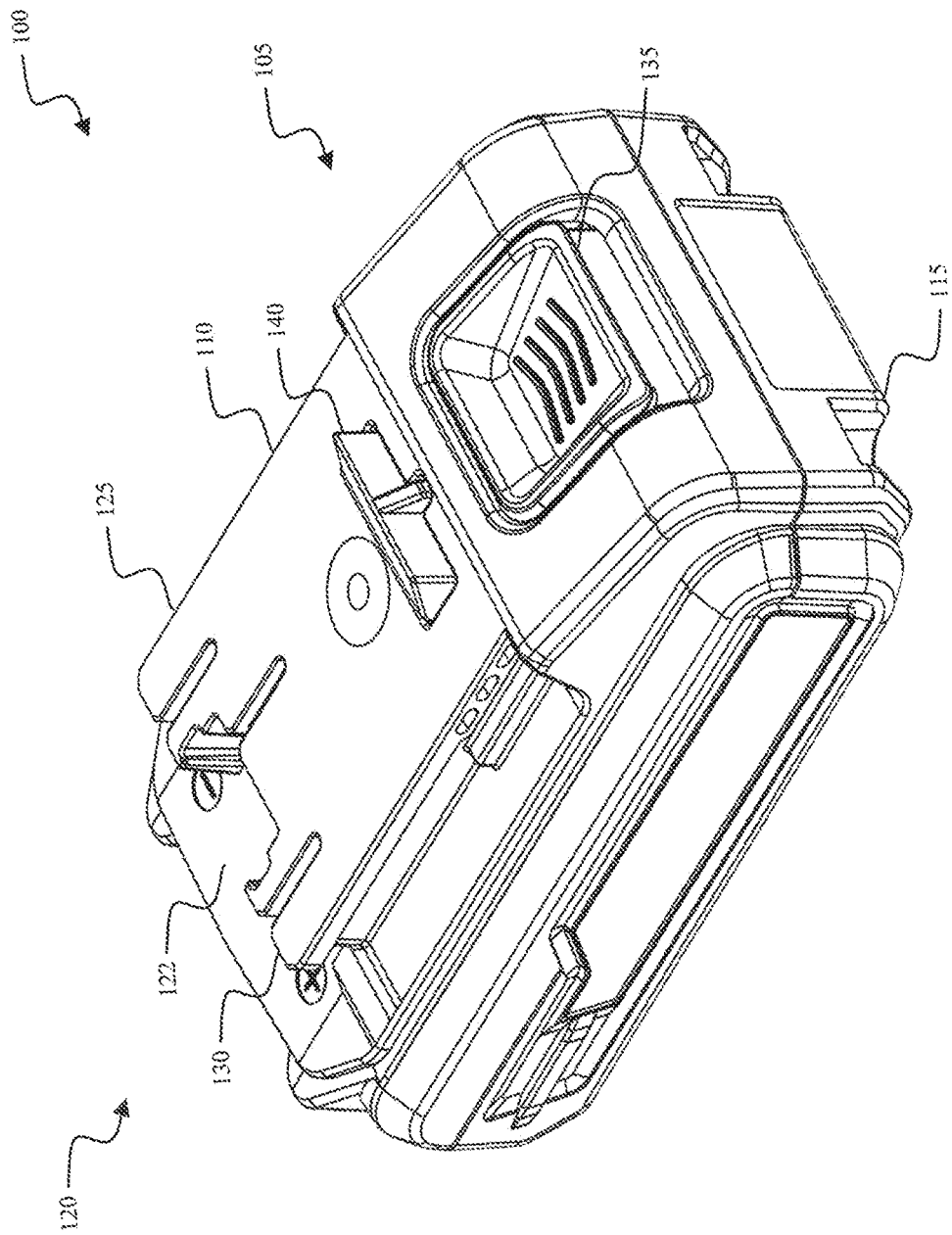
FIG. 1 is a perspective view of a battery pack, according to embodiments described herein.
Figure 2:
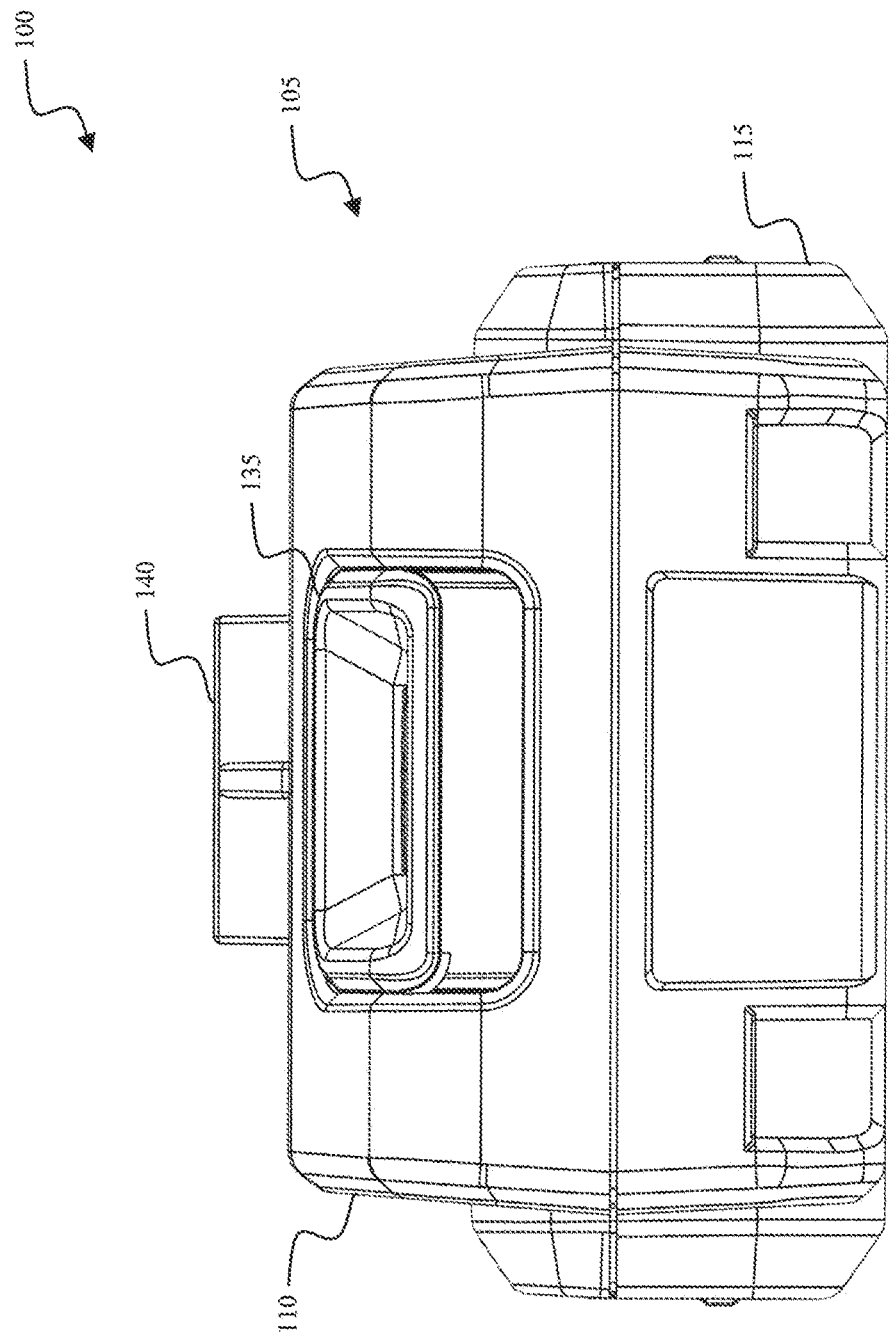
FIG. 2 is a front view of the battery pack of FIG. 1.

FIG. 1 illustrates a battery pack 100 that is connectable to and supportable by a cordless, hand-held power tool or another battery pack powered device. For example, the battery pack 100 is configured to be connectable to a screwdriver, a drill driver, an impact driver, an impact wrench, a hammer drill, a jigsaw, a bolt cutter, an offset shear, a planar, a table saw, a miter saw, a grinder, a circular saw, a reciprocating saw, a rotary cutter, a scroll saw, a fan, a caulk gun, a drain auger, a hot glue gun, a transfer pump, a blower, a vacuum cleaner, a propane heater, a cement mixer, a sander, a router, a buffer, a nailer, a staple gun, a light, a speaker, a compressor, an inflator, etc.

As shown in FIGS. 1-7, the battery pack 100 includes a housing 105. The housing 105 includes a top housing portion 110 and a bottom housing portion 115. Although the battery pack 100 is illustrated in FIGS. 1-7 including the top housing portion 110 and the bottom housing portion 115, in some embodiments, the battery pack 100 includes a left housing portion and a right housing portion. The battery pack 100 also includes a support portion 120 for supporting the battery pack 100 on, and coupling the battery pack 100 to, a device such as a hand-held power tool. The support portion 120 has a generally planar support surface 122. The support portion 120 includes a first rail 125 and a second rail 130 for slidably attaching the battery pack 100 to the device. The support portion 120 is connectable to a complementary support portion on the device (e.g., a battery pack receiving portion of a power tool). The battery pack 100 also includes a button 135 and a latch or coupling mechanism 140 for selectively coupling the battery pack 100 to, or releasing the battery pack 100 from, the device. In some embodiments, the button 135 and coupling mechanism 140 are considered to be included in the battery pack support portion 120.

Figure 3:
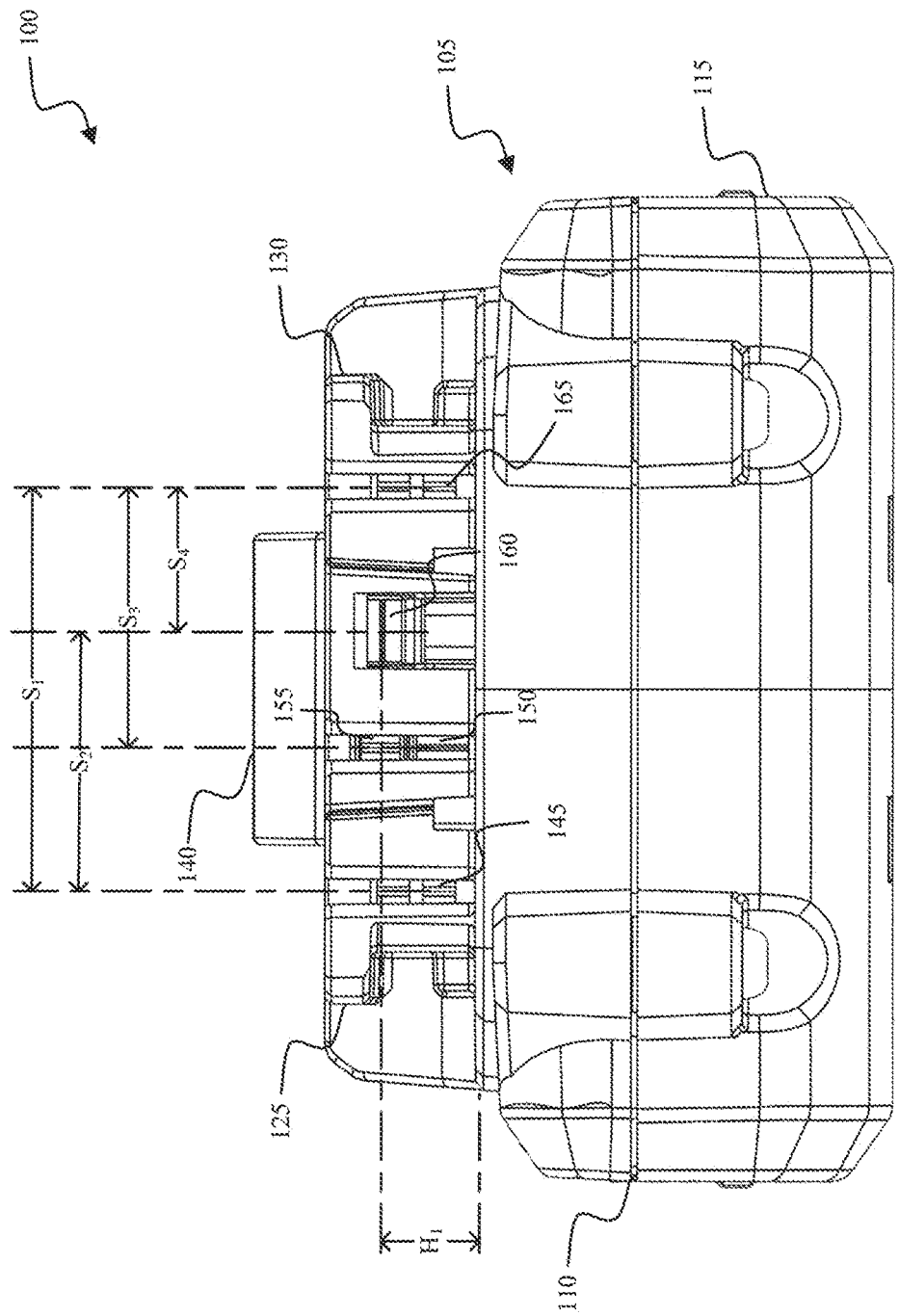
FIG. 3 is a rear view of the battery pack of FIG. 1.

The battery pack 100 includes a plurality of terminals within the support portion 120 that are operable to electrically connect one or more battery cells within the battery pack 100 to the device. As illustrated in FIG. 3, the plurality of terminals include a first terminal 145, a second terminal 150, a third terminal 155, a fourth terminal 160, and a fifth terminal 165. In some embodiments, the first terminal 145 is a battery negative (or ground) terminal, the second terminal 150 is a temperature terminal, the third terminal 155 is a communication terminal, the fourth terminal 160 is a low power or charging terminal, and the fifth terminal 165 is a battery positive terminal. In some embodiments, the second terminal 150 is the communication terminal and the third terminal 155 is a bypass terminal for bypassing a current sensing circuit.

The battery pack 100 is removably and interchangeably connected to a device, such as a hand-held power tool, to provide operational power to the device. The terminals 145, 150, 155, 160, and 165 are configured to mate with corresponding terminals extending from the device. The battery pack 100 substantially encloses and covers the terminals on the device when the pack 100 is positioned within a battery pack receiving portion of the device (i.e., the battery pack 100 functions as a cover for the opening and terminals of the device). Once the battery pack 100 is disconnected from the device, the terminals on the device are generally exposed to the surrounding environment. In this illustrated embodiment, the battery pack 100 is designed to substantially follow the contours of a hand-held power tool to match the general shape of an outer casing of a handle of the power tool, and the battery pack 100 generally increases (i.e., extends) the length of the grip of the power tool (e.g., a portion of the power tool below a motor).

Figure 5:
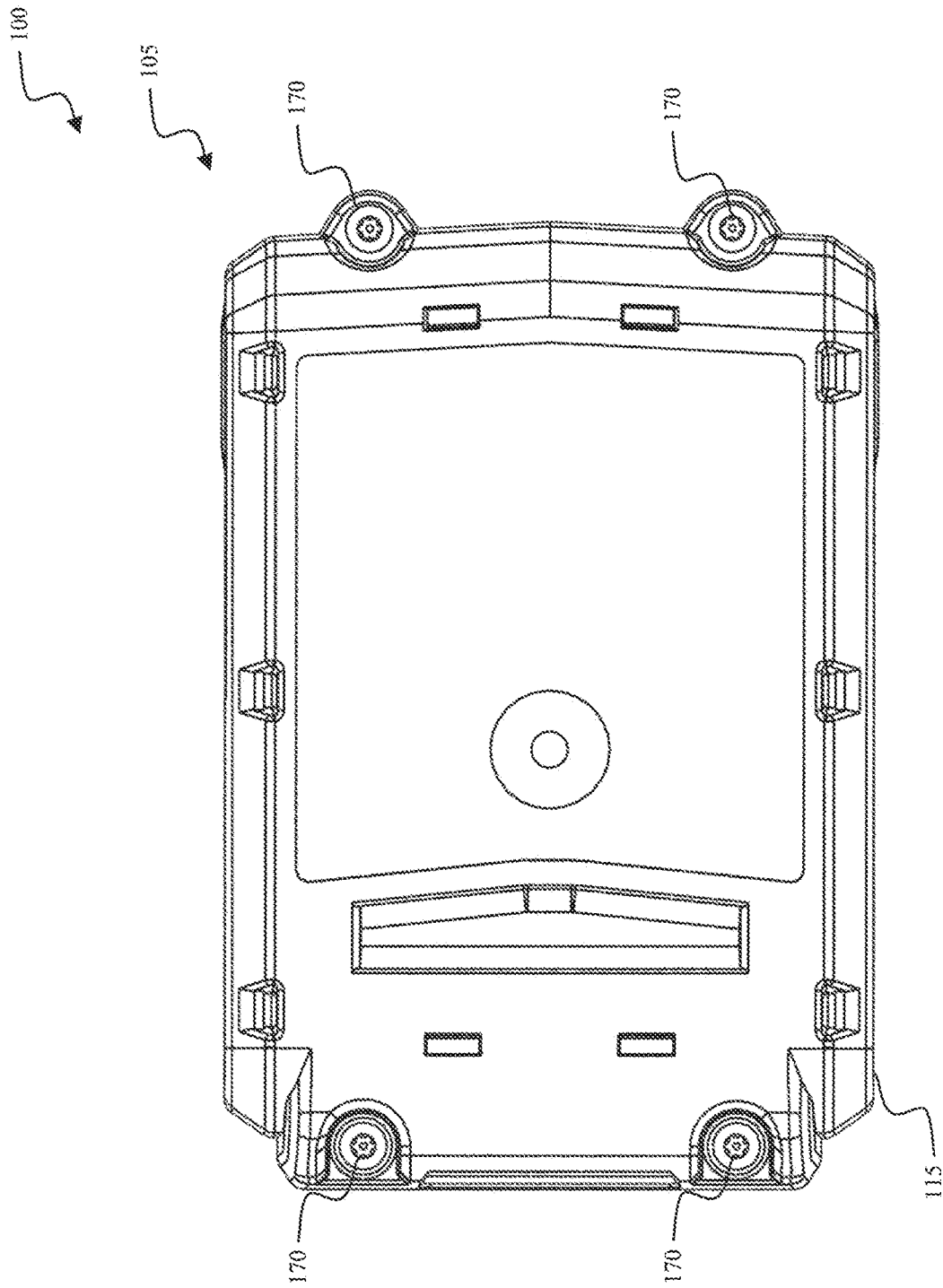
FIG. 5 is a bottom view of the battery pack of FIG. 1.
Figure 6:
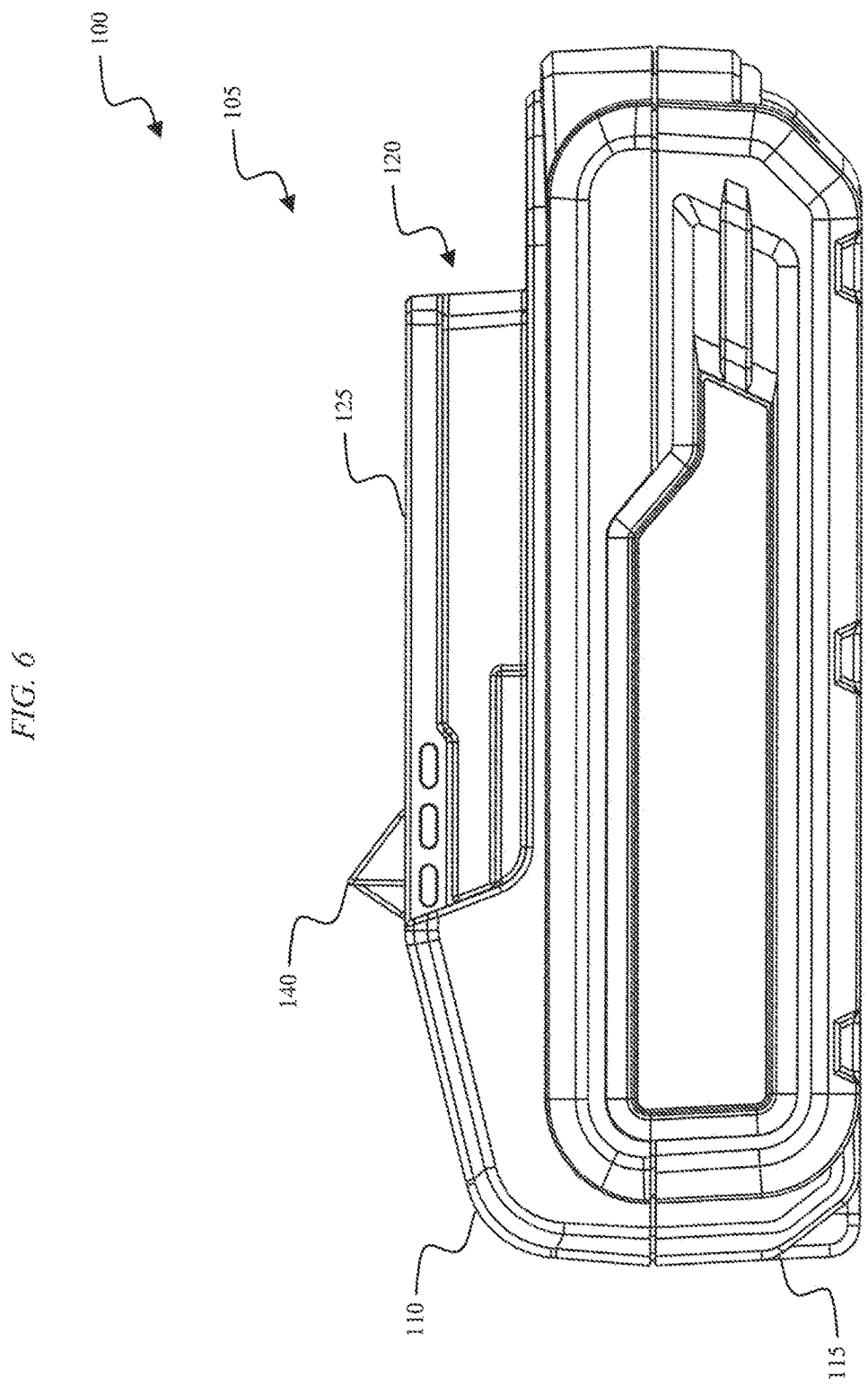
FIG. 6 is a right-side view of the battery pack of FIG. 1.
Figure 7:
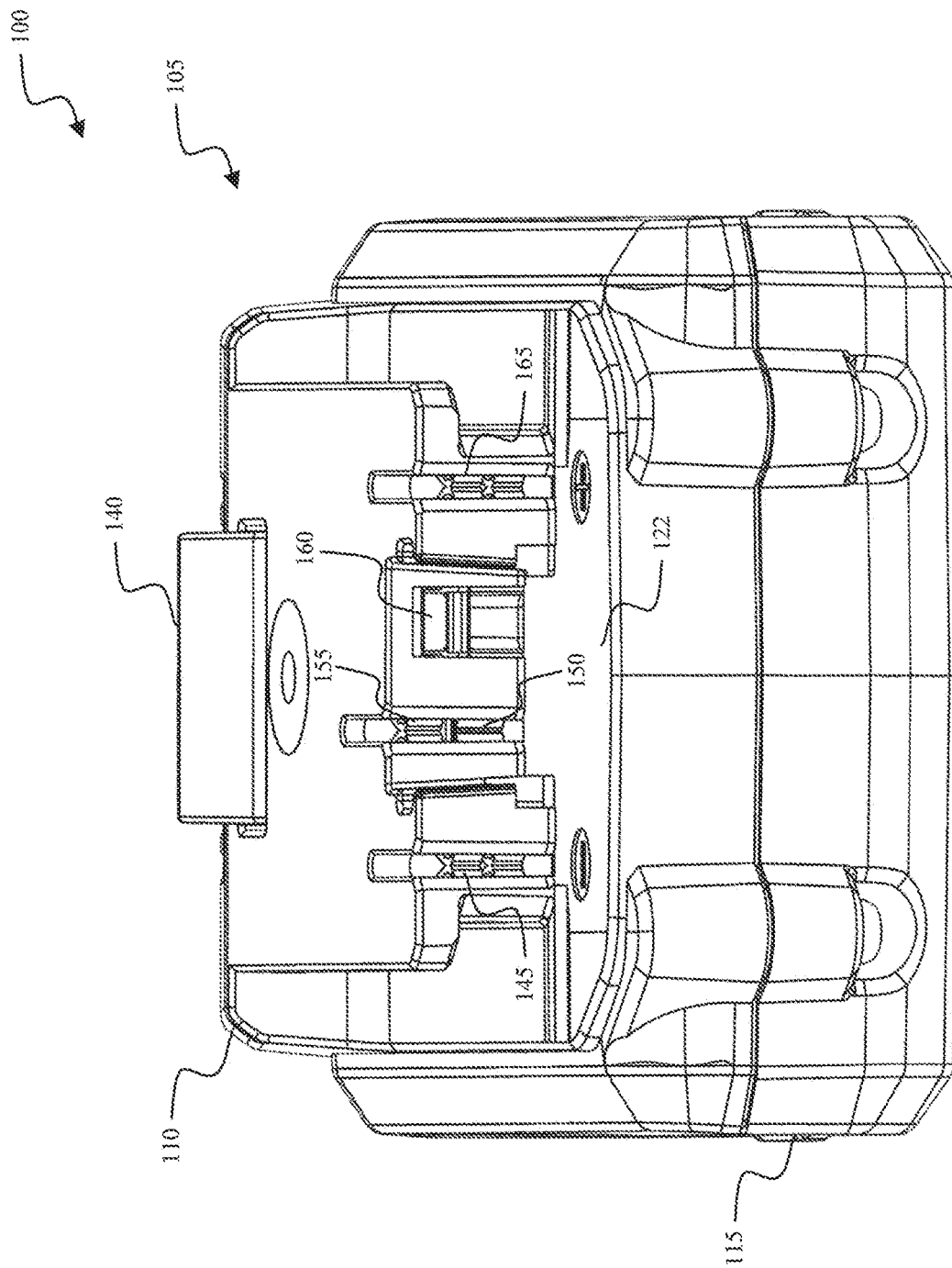
FIG. 7 is a rear-perspective view of the battery pack of FIG. 1.

As illustrated in FIG. 5, the bottom housing portion 115 of the housing 105 includes four fasteners 170 for fastening the bottom housing portion 115 to the top housing portion 110. For example, in some embodiments, the fasteners 170 are screws that extend vertically through apertures in the bottom housing portion 115 to engage a threaded aperture in the top housing portion 110. In other embodiments, the top housing portion 110 and the bottom housing portion 115 are fastened together in a different manner, such as using an adhesive or a fastener other than a screw.

Figure 8:
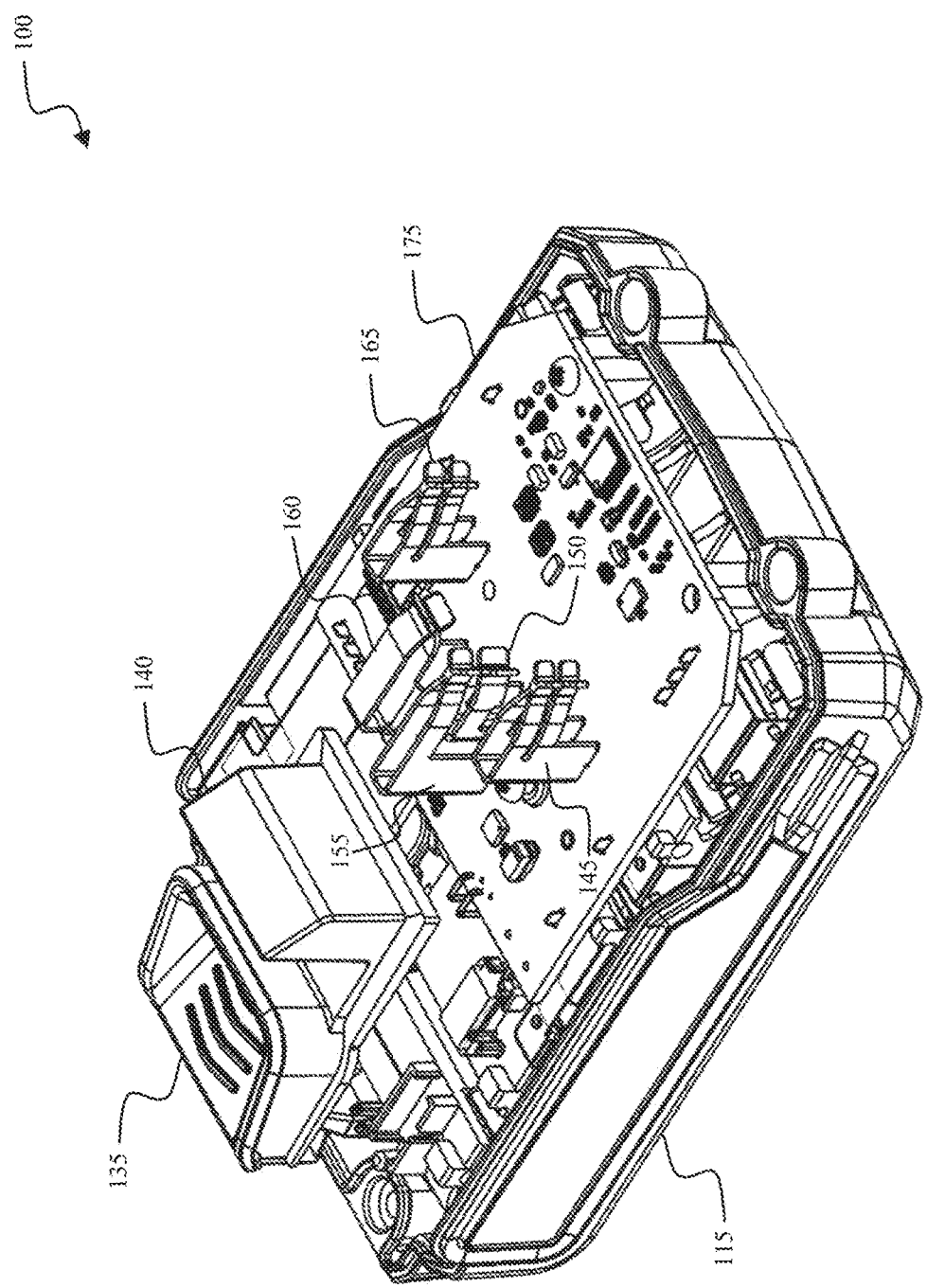
FIG. 8 is a perspective view of the battery pack of FIG. 1 with a top housing portion of the battery pack removed.

FIG. 8 illustrates the battery pack 100 with the top housing portion 110 removed. With the top housing portion 110 removed from the battery pack 100, the terminals 145, 150, 155, 160, and 165 and a printed circuit board ("PCB") 175 are exposed. In the illustrated embodiment, the first terminal 145 and fifth terminal 165 include first and second pairs of female blade terminals for receiving a male blade terminal from a device connected to the battery pack 100. Referring to FIGS. 3 and 8, the pairs of female blade terminals of the first and fifth terminals 145, 165 are substantially orthogonal to the support surface 122. The first pair of female blade terminals of the first terminal 145 are movable relative to each other in a direction generally parallel to the support surface 122, and the second pair of female blade terminals of the first terminal 145 are movable relative to each other in a direction generally parallel to the support surface 122, to receive the corresponding male blade terminal(s) from a device. Similarly, the first pair of female blade terminals of the fifth terminal 165 are movable relative to each other in a direction generally parallel to the support surface 122, and the second pair of female blade terminals of the fifth terminal 165 are movable relative to each other in a direction generally parallel to the support surface 122, to receive the corresponding male blade terminal(s) from a device. The second terminal 150, the third terminal 155, and the fourth terminal 160 include a single pair of female blade terminals for receiving a male blade terminal from a device connected to the battery pack 100. Referring to FIGS. 3 and 8, the pair of female blade terminals of the fourth terminal 160 extend generally parallel to the support surface 122. The pair of female blade terminals of the fourth terminal 160 are movable relative to each other in a direction generally orthogonal to the support surface 122 to receive the corresponding male blade terminal(s) from s device. The pairs of female blade terminals of the second and third terminals 150, 155 are substantially orthogonal to the support surface 122. The pair of female blade terminals of the second terminal 150 are movable relative to each other in a direction generally parallel to the support surface 122 to receive the corresponding male blade terminal(s) from a device. The pair of female blade terminals of the third terminal 155 are movable relative to each other in a direction generally parallel to the support surface 122 to receive the corresponding male blade terminal(s) from a device. A line connecting a point at which the pair of female blade terminals of the second terminal 150 meet and a point at which the pair of female blade terminals of the third terminal 155 meet is generally orthogonal to the support surface 122. In some embodiments, the first terminal 145 is used by low power devices and, when a device is connected to the first terminal 145, the battery pack 100 is configured to monitor a discharge current to the device. In such embodiments, the third terminal 155 can be a bypass terminal that bypasses a discharge current monitoring circuit (e.g., when the battery pack 100 is connected to a high power device). Although five terminals 145, 150, 155, 160, and 165 are illustrated, a device connected to the battery pack 100 is not required to electrically connect to each of the terminals 145, 150, 155, 160, and 165. For example, in some embodiments, a low- or lower-powered device electrically connects to the first terminal 145 and the fourth terminal 160. In some embodiments, a charger for the battery pack 100 electrically connects to the first terminal 145, the third terminal 155, and the fourth terminal 160. In some embodiments, a high- or higher-powered device (e.g., a power tool) electrically connects to the first terminal 145, the third terminal 155, and the fifth terminal 165.

Referring to FIG. 3, the first terminal 145 and the fifth terminal 165 (e.g., a point at which the first pair [or second pair] of female terminals of the first terminal 145 meet and a point at which the first pair [or second pair] of female terminals of the fifth terminal 165 meet) form a plane orthogonal to the support surface and are spaced apart by a separation S1 in a direction generally parallel to the support surface 122. The separation S1 is between about 30 mm to about 33 mm (e.g., about 31.28 mm). The first terminal 145 and the fourth terminal 160 (e.g., a point at which the first pair of [or second pair of] female terminals of the first terminal 145 meet and a mid-point of the female terminals of the fourth terminal 160 [along a direction parallel to the support surface 122]) are spaced apart by a separation S2 in a direction generally parallel to the support surface 122. The plane formed by the female terminals of the fourth terminal is parallel to the support surface 122. In some embodiments, the separation S2 is between about 19 mm to about 22 mm (e.g., about 20.1 mm). The second (or third) terminal 150, 155 and the fifth terminal 165 (e.g., a point at which the pair of female terminals of the first second [or third] terminal 150, 155 meet and a point at which the first pair of [or second pair of] female terminals of the fifth terminal 165 meet) form a plane orthogonal to the support surface and are spaced apart by a separation S3 in a direction generally parallel to the support surface 122. In some embodiments, the separation S3 is between about 19 mm to about 22 mm (e.g., about 20.23 mm). The fifth terminal 165 and the fourth terminal 160 (more particularly a point at which the first pair of [or second pair of] female terminals of the fifth terminal 165 meet and a mid-point of the female terminals of the fourth terminal 160 [along a direction parallel to the support surface 122]) are spaced apart by a separation S4 in a direction generally parallel to the support surface 122. In some embodiments, the separation S4 is between about 10 mm to about 13 mm (e.g., about 11.20 mm). The fourth terminal 160 has a height H1, defined by a distance between the support surface 122 and a point at which the female blade terminals of the fourth terminal 160 meet. In some embodiments, the height H1 is between about 8 mm to about 11 mm (e.g., about 9.28 mm).

Figure 9:
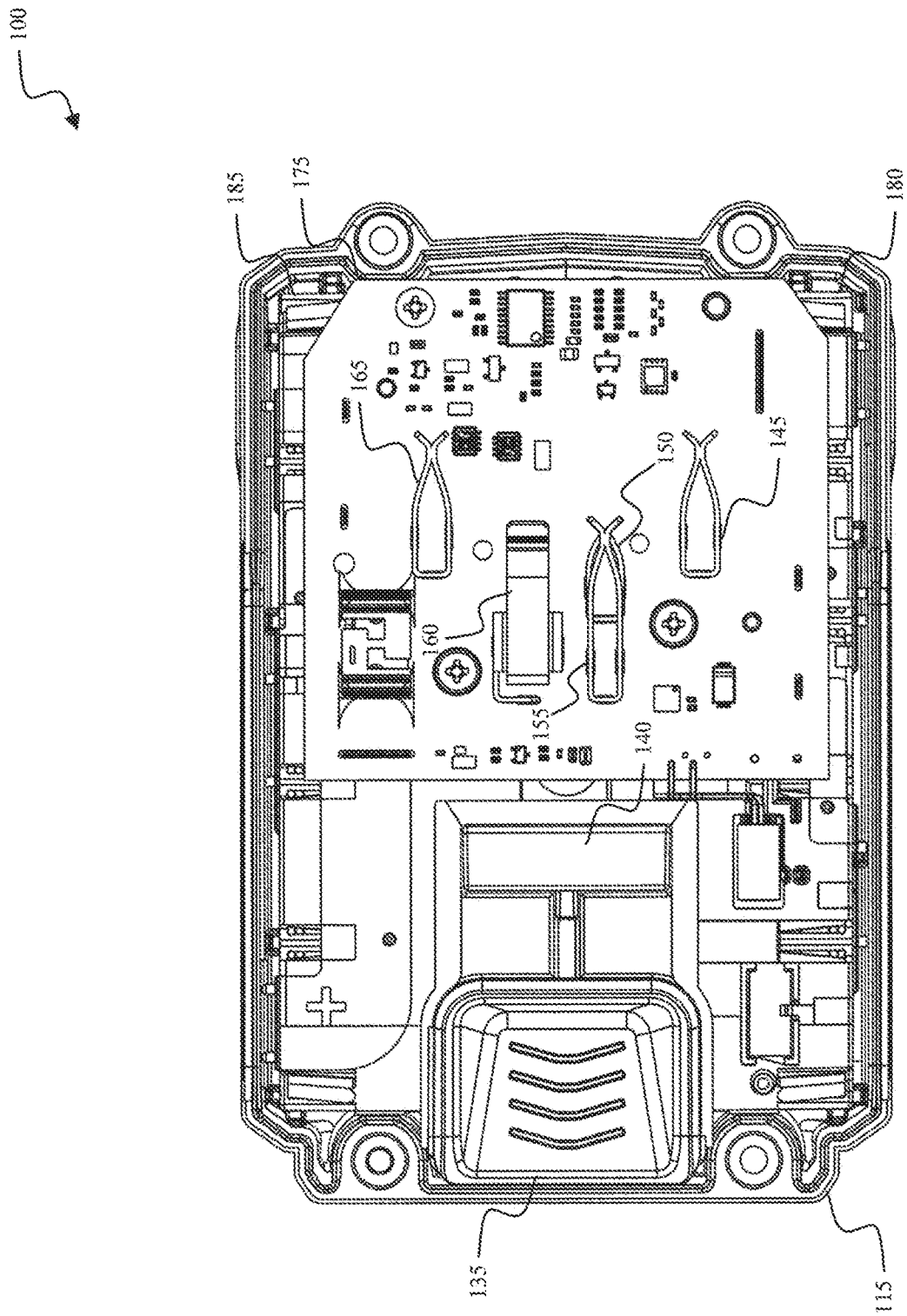
FIG. 9 is a top view of the battery pack of FIG. 8 with the top housing portion of the battery pack removed.
Figure 10:
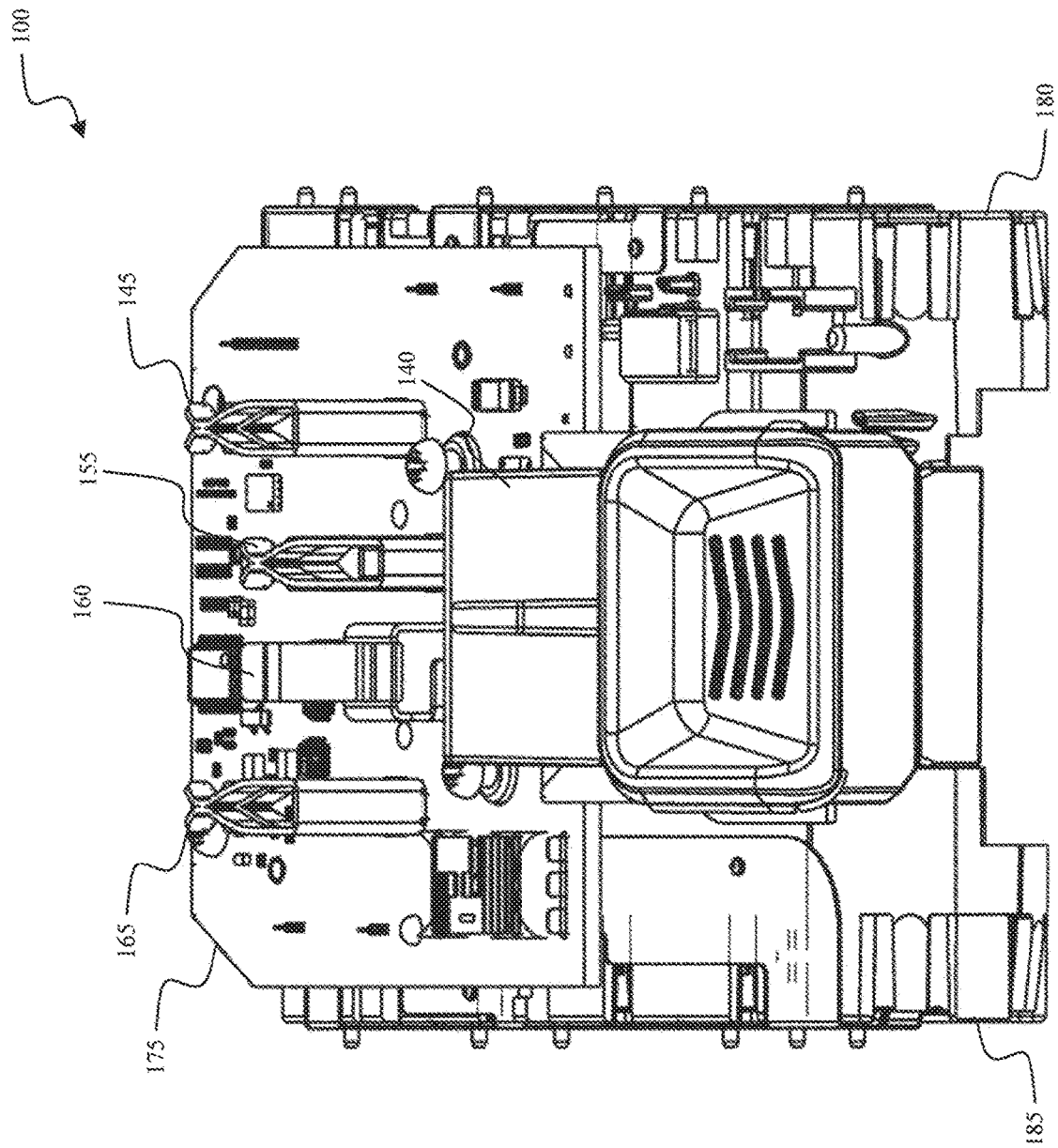
FIG. 10 is a front-perspective view of the battery pack of FIG. 8 with the top housing portion of the battery pack removed.

The battery pack 100 is configured to include a plurality of battery cells that are arranged and spaced apart from one another by a first battery cell holder 180 and a second battery cell holder 185, as illustrated in FIGS. 9 and 10. The first battery cell holder 180 receives a first end of the battery cells, and the second battery cell holder 185 receives a second end of the battery cells. As a result, the first battery cell holder 180 and the second battery cell holder 185 are configured to sandwich the battery cells and hold the battery cells within the battery pack housing 105. In some embodiments, the first battery cell holder 180 and the second battery cell holder 185 are configured as an upper cell holder and a lower cell holder such that the battery cells are sandwiched between the upper cell holder and the lower cell holder. In other embodiments, a single cell holder is used in place of the first cell holder 180 and the second cell holder 185.

In some embodiments, the battery pack 100 includes five battery cells 190. In other embodiments, the battery pack 100 includes more or fewer battery cells 190. The battery cells 190 can be arranged in series, parallel, or a series-parallel combination. For example, the battery pack 100 can include a total of five battery cells 190 configured in a series arrangement. In some embodiments, a series-parallel combination of battery cells 190 allows for an increased voltage and an increased capacity of the battery pack 100. In other embodiments, the battery pack 100 includes a different number of battery cells (e.g., between three and twelve battery cells) connected in series, parallel, or a series-parallel combination in order to produce a battery pack having a desired combination of nominal battery pack voltage and capacity.

Figure 11:
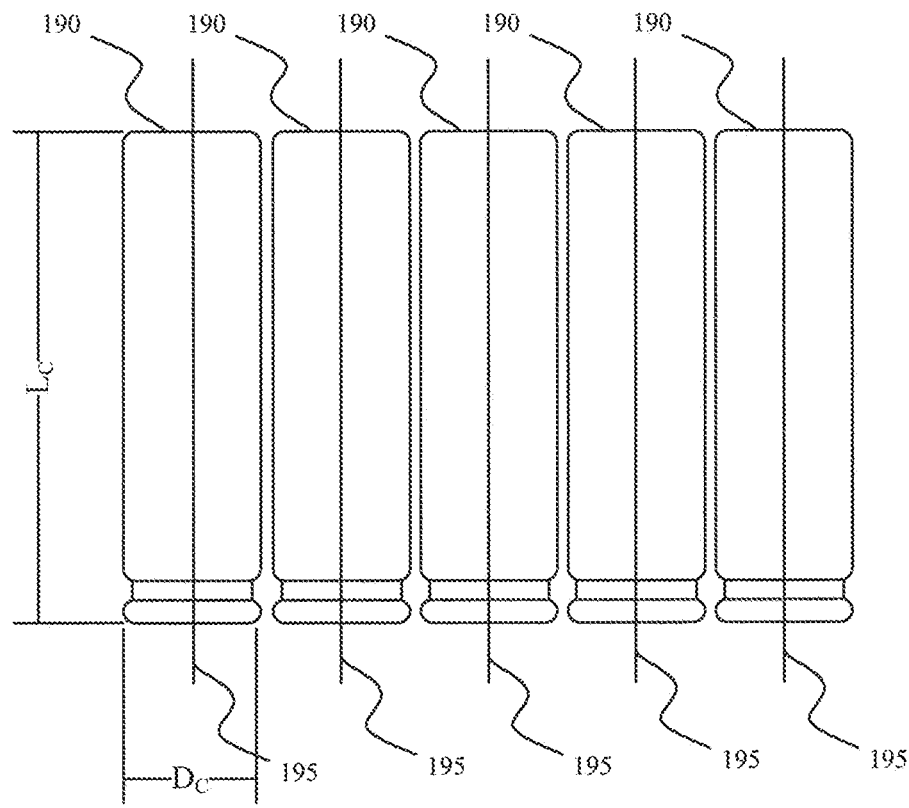
FIGS. 11 and 12 illustrate battery cells included in the battery pack of FIG. 1.
Figure 12:
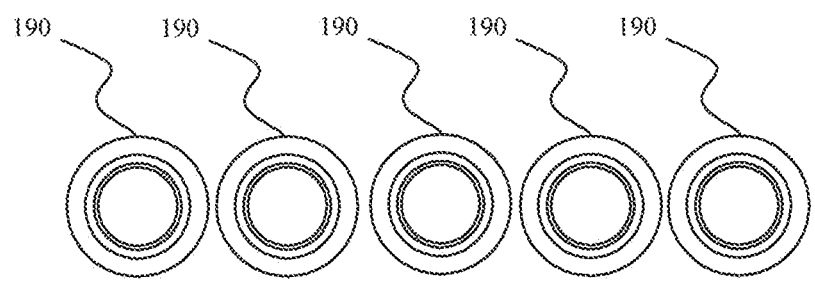

The battery cells 190 are, for example, cylindrical 18650 battery cells (18 mm diameter and 65 mm length). Each battery cell includes a cell axis 195, a cell length, $L_C$, and a cell diameter, $D_C$, as illustrated in FIGS. 11 and 12. In other embodiments, the battery cells 190 are, for example, cylindrical 14500 battery cells (14 mm diameter and 50 mm length), 14650 battery cells (14 mm diameter and 65 mm length), 17500 battery cells (17 mm diameter and 50 mm length), 17670 battery cells (17 mm diameter and 67 mm length), 18500 battery cells (18 mm diameter and 50 mm length), 21650 battery cells (21 mm diameter and 65 mm length), 21700 battery cells (21 mm diameter and 70 mm length), etc. Each battery cell 190 can be generally cylindrical and can extend along the cell axis 195 parallel to the cylindrical outer cell wall. Also, in the battery pack 100, each battery cell 190 can have a cell length, $L_C$, which is greater than or equal to two times the cell diameter, $D_C$.

The battery cells 190 are lithium-based battery cells having a chemistry of, for example, lithium-cobalt ("Li—Co"), lithium-manganese ("Li—Mn"), or Li—Mn spinel. In some embodiments, the battery cells 190 have other suitable lithium or lithium-based chemistries, such as a lithium-based chemistry that includes manganese, etc. The battery cells within the battery pack 100 provide operational power (e.g., voltage and current) to a device. In some embodiments, each battery cell 190 has a nominal voltage of approximately 3.6V, such that the battery pack 100 has a nominal voltage of approximately 18V. In other embodiments, the battery cells 190 have different nominal voltages, such as, for example, between 3.6V and 4.2V, and the battery pack has a different nominal voltage, such as, for example, 10.8V, 12V, 14.4V, 24V, 28V, 36V, 50V, between 10.8V and 100V, etc. The battery cells 190 also have a capacity of, for example, approximately between 1.0 Ah and 10.0 Ah. In exemplary embodiments, the battery cells have capacities of approximately, 1.5 Ah, 2.4 Ah, 3.0 Ah, 4.0 Ah, between 1.0 Ah and 10.0 Ah, etc.

The battery cells 190 are arranged and spaced apart from one another by the first battery cell holder 180 and the second battery cell holder 185 to reduce the cell-to-cell heat transfer between the battery cells 190 and to improve the collection and removal of heat from the battery cells 190. In this manner, the battery cells 190 may be able to be maintained in an appropriate temperature operating range (e.g., below 60° C.) for longer durations of use. The battery cells 190 are also arranged to provide an efficient use of space and to maintain a relatively small pack size.

Figure 4:
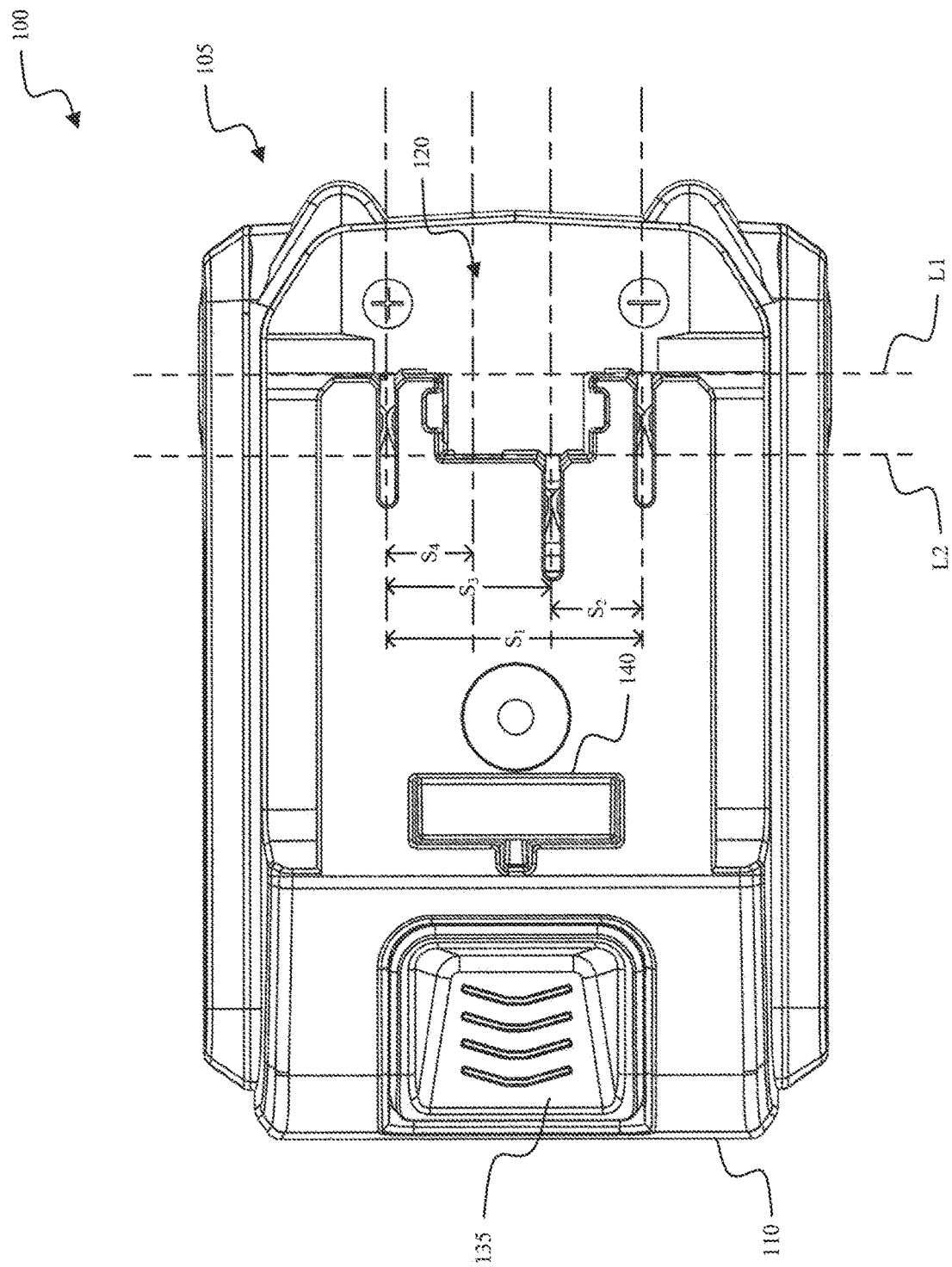
FIG. 4 is a top view of the battery pack of FIG. 1.
Figure 13:
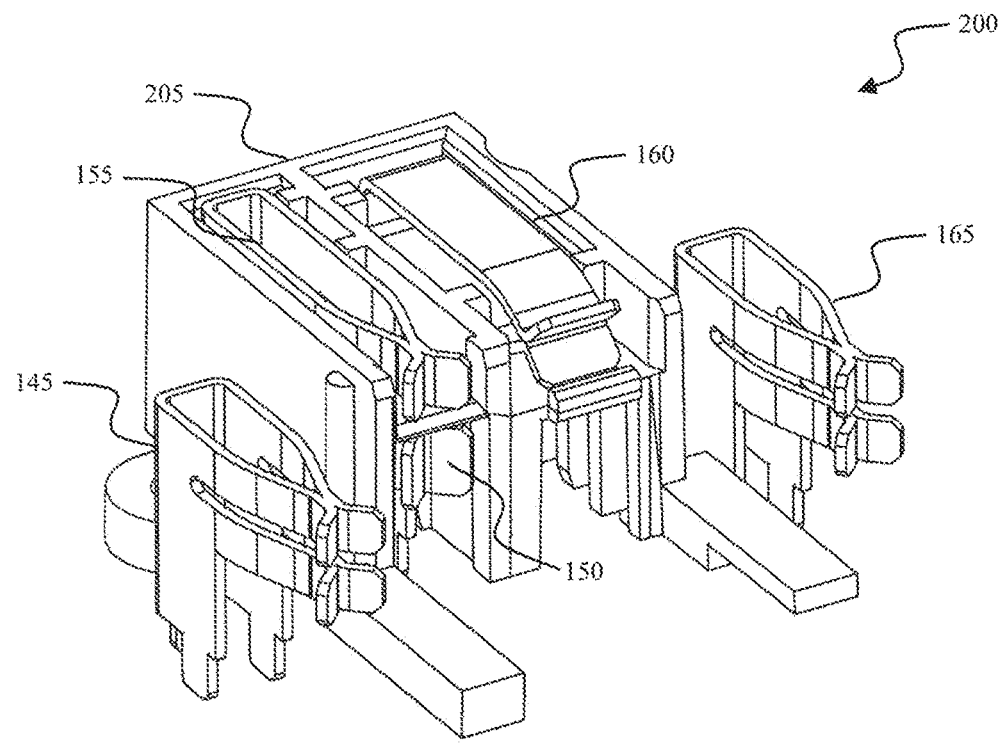
FIG. 13 illustrates a terminal assembly of the battery pack of FIG. 1, according to embodiments described herein.
Figure 14:
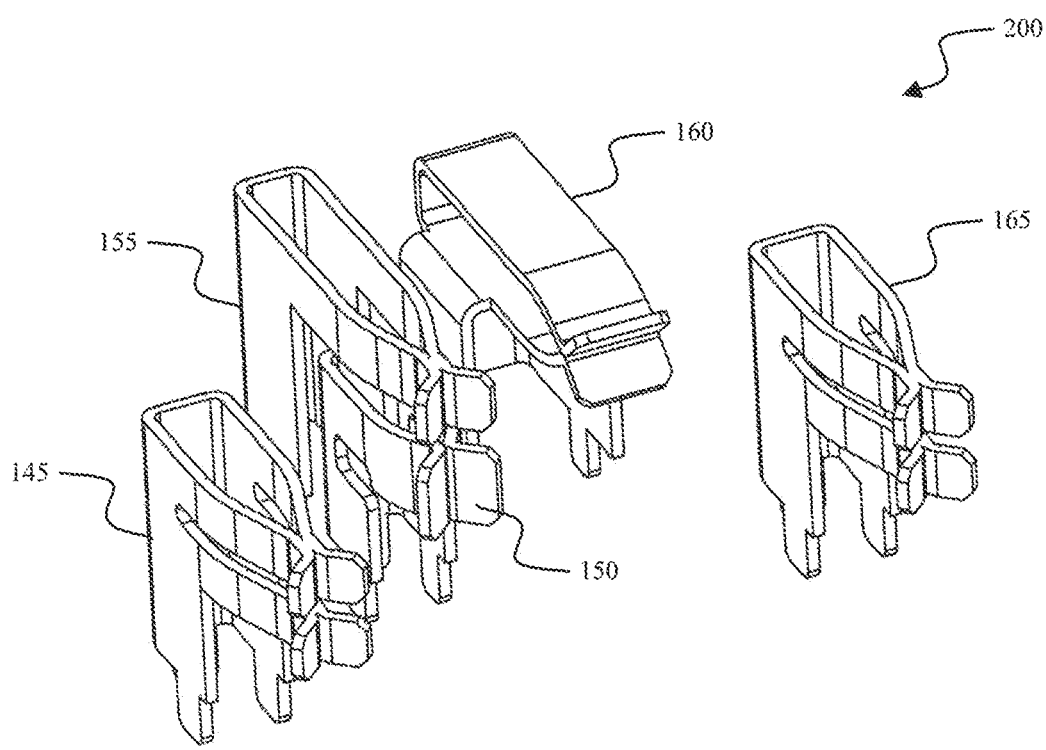
FIG. 14 illustrates the terminal assembly of FIG. 13 with a terminal assembly structure removed.
Figure 15:
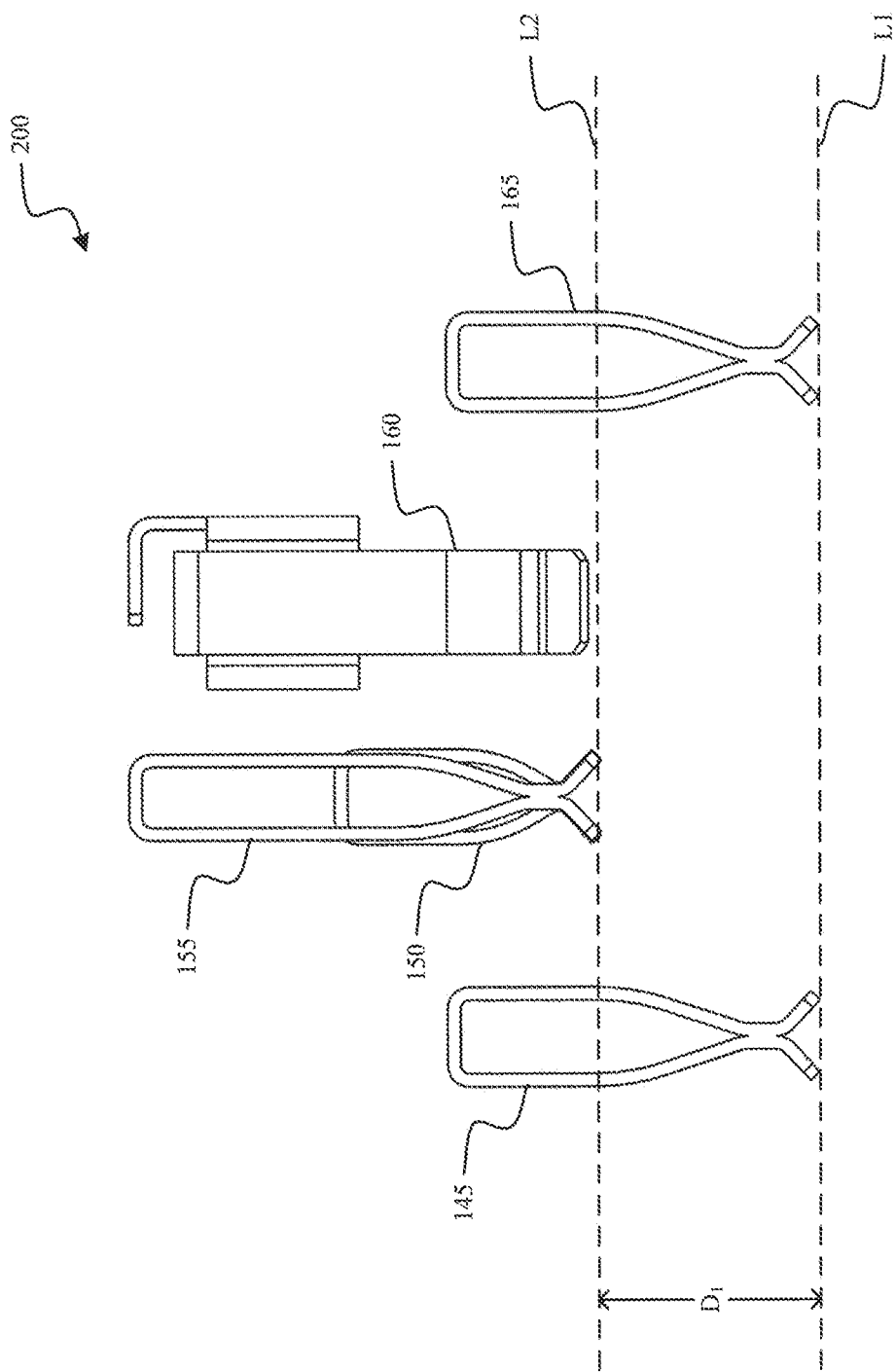
FIG. 15 illustrates terminals of the battery pack of FIG. 1 at staggered depth levels, according to embodiments described herein.

A terminal assembly 200 for the battery pack 100 is illustrated in FIG. 13. The terminal assembly 200 includes a terminal assembly support structure 205 around which the terminals 145, 150, 155, 160, and 165 are positioned. With reference to FIGS. 4 and 15-19, the terminals 145, 150, 155, 160, and 165 include terminals that are staggered at different depths with respect to one another. As illustrated in FIG. 4, the battery pack 100 includes a first depth level, L1, and a second depth level, L2, for the terminals 145, 150, 155, 160, and 165. In the embodiment of the battery pack 100 illustrated in FIG. 4, the first terminal 145 and the fifth terminal 165 are positioned within the support portion 120 at the first depth level, L1. The terminals 150, 155, and 160 are positioned within the support portion 120 at the second depth level, L2. Such a configuration of battery terminals is also illustrated in FIG. 15. With reference to FIG. 15, the terminal assembly 200 includes the first depth level, L1, and the second depth level, L2. The first depth level, L1, and the second depth level, L2, are separated from one another by a first distance, D1. In some embodiments, the first distance, D1, is between about 6 mm and 20 mm (e.g., about 10 mm). By positioning the terminals 145, 150, 155, 160, and 165 at varied depths with respect to one another, the staggered terminals function as a keying feature that limits the manner in which devices can connect to the battery pack 100. For example, the device to which the battery pack 100 is connected would need to include a specially configured interface to connect to the terminals 150, 155, and 160 positioned at the second depth level, L2, in FIG. 15. In the embodiment illustrated in FIG. 15, the terminal assembly 200 includes a plurality of terminals at the first depth level, L1, and a plurality of terminals at the second depth level, L2.

Figure 16:
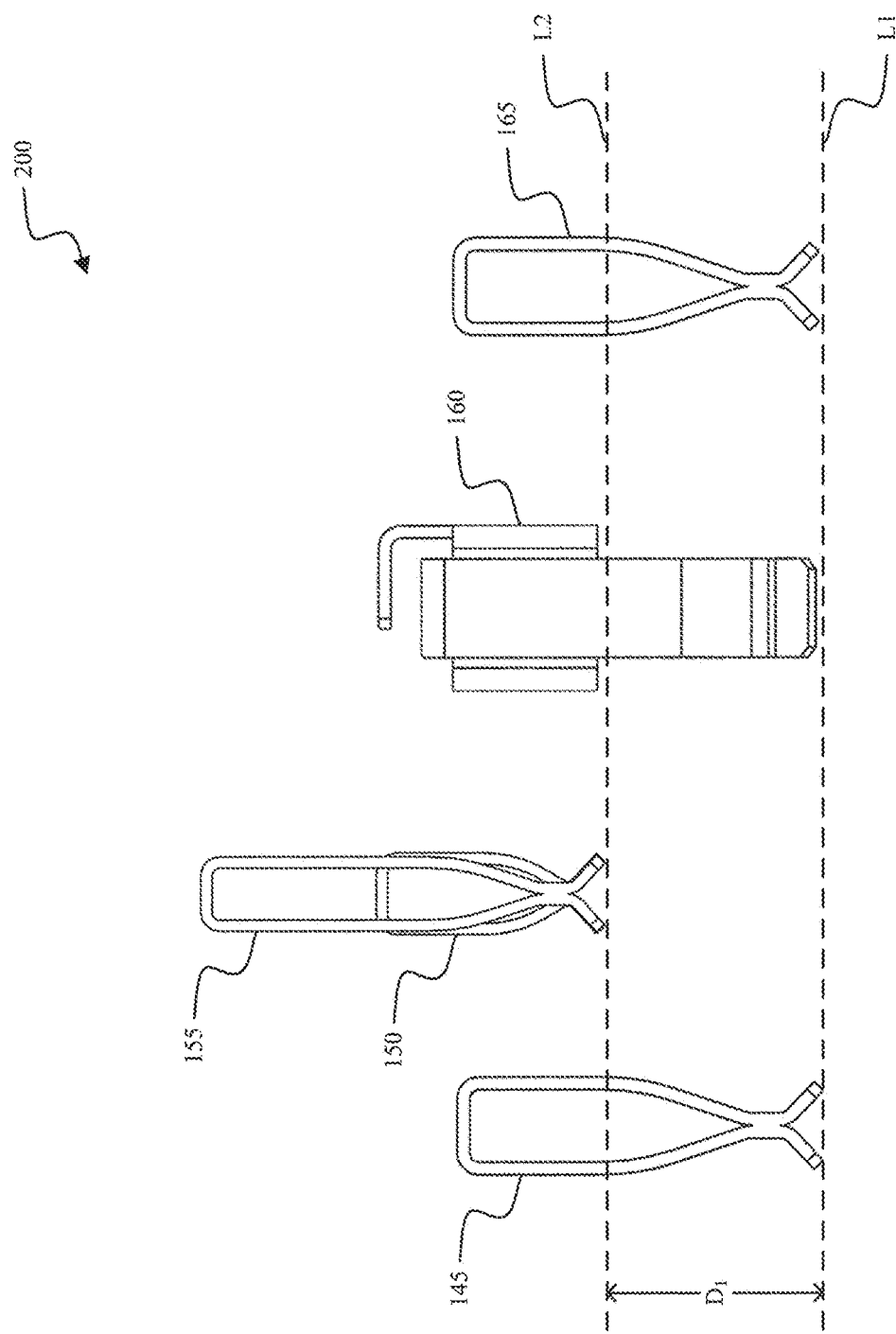
FIG. 16 illustrates terminals of the battery pack of FIG. 1 at staggered depth levels, according to embodiments described herein.
Figure 17:
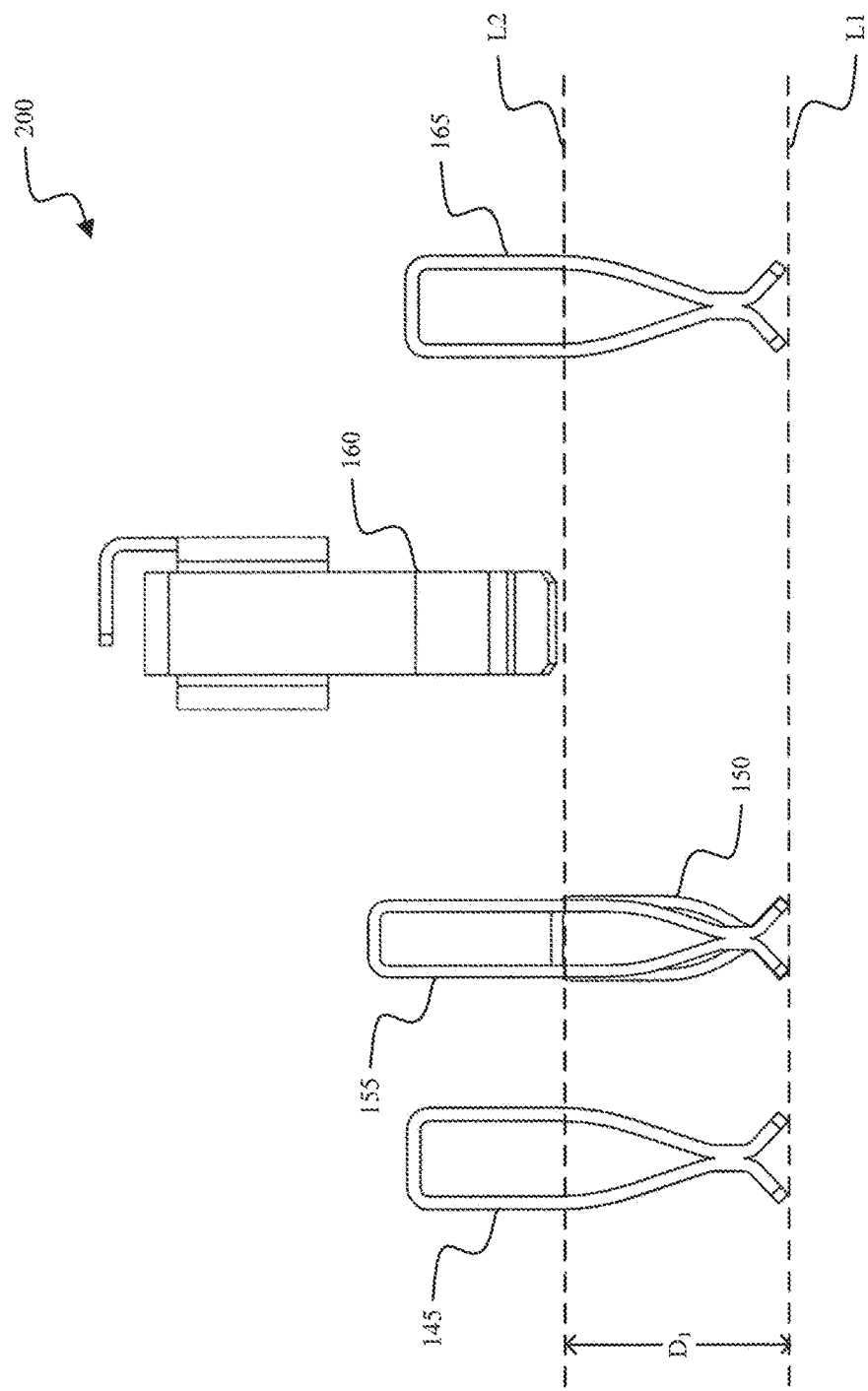
FIG. 17 illustrates terminals of the battery pack of FIG. 1 at staggered depth levels, according to embodiments described herein.

In other embodiments, different configurations of the battery terminals 145, 150, 155, 160, and 165 are used. For example, FIG. 16 illustrates terminals 145, 160, and 165 at the first depth level, L1, and terminals 150, and 155 at the second depth level, L2. In the embodiment illustrated in FIG. 17, terminals 145, 150, 155, and 165 are positioned at the first depth level, L1, and terminal 160 (i.e., a single terminal) is positioned at the second depth level, L2. In the embodiment illustrated in FIG. 18, the terminal 160 (i.e., a single terminal) is positioned at the first depth level, L1, and terminals 145, 150, 155, and 165 are positioned at the second depth level, L2. In the embodiment illustrated in FIG. 19, the terminal assembly 200 includes a third depth level, L3, and a second distance, D2, between the second depth level, L2, and the third depth level, L3. In some embodiments, the second distance, D2, is between about 0.6 mm and 20 mm (e.g., about 1 mm). As illustrated in FIG. 19, the terminals 145 and 165 are positioned at the first depth level, L1, the terminals 150 and 155 are positioned at the second depth level, L2, and the terminal 160 is positioned at the third depth level, L3.

With reference to FIGS. 3, 7-10, and 13-20, the terminals 145, 150, 155, 160, and 165 also include terminals of different orientations. For example, the first terminal 145, the second terminal 150, the third terminal 155, and the fifth terminal 165 are illustrated as terminals having a vertical orientation with respect to the battery pack 100. The terminals 145, 150, 155, and 165 have a vertical orientation because, for example, a height, $H_1$, of each terminal exceeds a width, $W_1$, of the terminal (see FIG. 20). The fourth terminal 160 is illustrated as having a horizontal orientation with respect to the battery pack 100 because, for example, a height, $H_2$, of the terminal 160 is less than a width, $W_2$, of the terminal 160 (see FIG. 20). In some embodiments, the terminals having a vertical orientation and the terminals having horizontal orientation have an approximately orthogonal relationship with respect to one another.

Additionally, as illustrated in FIG. 20, the female blade terminals for each of terminals 145, 150, 155, 160, and 165 are similarly vertically or horizontally oriented to mate with corresponding male terminals of a device. Specifically, the female blade terminals for the first terminal 145 and the fifth terminal 165 are oriented with one pair of female blade terminals positioned above a second pair of female blade terminals, which corresponds to a vertical orientation for the terminals 145 and 165. A single pair of female blade terminals for the fourth terminal 160 corresponds to a horizontal orientation for the fourth terminal 160. The second terminal 150 and the third terminal 155 each include a single pair of female blade terminals. However, because the terminals 150 and 155 are aligned with one another, the combination of the second terminal 150 and the third terminal 155 has a vertical orientation similar to the pairs of female blade terminals for terminals 145 and 165. In some embodiments, a plurality of the terminals 145, 150, 155, 160, and 165 have a horizontal orientation.

The orientation of a male blade terminal that connects to the female blade terminals of the terminals 145, 150, 155, 160, and 165 have similar orientations. For example, the male blade terminal of a power tool or device to which the battery pack 100 connects has a vertical terminal orientation when the male blade terminal is configured to interface with vertically-oriented pairs of female blade terminals (e.g., first terminal 145 or fifth terminal 165). Similarly, the male blade terminal of a power tool or device to which the battery pack 100 connects has a horizontal terminal orientation when the male blade terminal is configured to interface with horizontally-oriented pairs of female blade terminals (e.g., fourth terminal 160).

The orientation of the terminals 145, 150, 155, 160, and 165 can function as a keying feature that limits the devices to which the battery pack 100 can be connected and the manner in which they are connected. For example, when the terminal 160 is a charging terminal and is horizontally-oriented, the battery pack 100 can only be charged by a battery charger including a correspondingly horizontally-oriented charging terminal. Similarly, when the terminal 160 is a low-power (e.g., low-current) output terminal, the terminal 160 can only provide a low-power discharge to a device that includes a correspondingly horizontally-oriented power terminal. Although the terminal 160 is illustrated as being the only horizontally-oriented terminal of the battery pack 100, in other embodiments, any one or more of terminals 145, 150, 155, 160, and 165 can be horizontally-oriented.

Thus, embodiments described herein provide, among other things, a battery pack including terminals for electrically connecting to a device. The battery pack physically connects to the device through a support portion of the battery pack, and the terminals are positioned at staggered depth levels within the support portion. Various features and advantages are set forth in the following claims.

What is claimed is:

1. A battery pack comprising:
  a housing including a battery pack support portion configured to removably mechanically connect the battery pack to a device, the battery pack support portion including a first rail, a second rail, and a coupling mechanism for securing the battery pack to the device;
  a plurality of battery cells located within the housing;
  a first battery pack terminal configured to electrically connect the battery pack to the device, the first battery pack terminal located at a first depth level within the battery pack support portion;
  a second battery pack terminal configured to electrically connect the battery pack to the device, the second battery pack terminal located at a second depth level within the battery pack support portion; and a third battery pack terminal configured to electrically connect the battery pack to the device, the third battery pack terminal located at the second depth level within the battery pack support portion;

wherein there is a first distance between the first depth level of the battery pack support portion and the second depth level of the battery pack support portion, wherein the first battery pack terminal is a battery negative power terminal, the second battery pack terminal is a low power terminal, and the third battery pack terminal is a communication terminal, wherein the first battery pack terminal and the third battery pack terminal are oriented on a first plane, and wherein the second battery pack terminal is oriented on a second plane perpendicular to the first plane.

2. The battery pack of claim 1, further comprising a fourth battery pack terminal configured to electrically connect the battery pack to the device, the fourth battery pack terminal located at the first depth level of the battery pack support section.

3. The battery pack of claim 1, further comprising a third battery pack terminal configured to electrically connect the battery pack to the device, the third battery pack terminal located at a third depth level of the battery pack support portion.

4. The battery pack of claim 3, wherein there is a second distance between the second depth level and the third depth level.

5. A battery pack comprising:

a housing including a battery pack support portion configured to removably mechanically connect the battery pack to a device, the battery pack support portion including a first rail, a second rail, and a coupling mechanism for securing the battery pack to the device, the battery pack support portion having a first depth level and a second depth level, the first depth level and the second depth level separated by a first distance;

a plurality of battery cells located within the housing;

a first battery pack terminal configured to electrically connect the battery pack to the device, the first battery pack terminal located at the first level of the battery pack support portion;

a second battery pack terminal configured to electrically connect the battery pack to the device, the second battery pack terminal located at the second depth level of the battery pack support portion; and a third battery pack terminal configured to electrically connect the battery pack to the device, the third battery pack terminal located at the second depth level within the battery pack support portion;

wherein the first battery pack terminal is a battery negative power terminal and the second battery pack terminal is a low power terminal, and the third battery pack terminal is a communication terminal, wherein the first battery pack terminal and the third battery pack terminal are oriented on a first plane, and wherein the second battery pack terminal is oriented on a second plane perpendicular to the first plane.

6. The battery pack of claim 5, further comprising a fourth battery pack terminal configured to electrically connect the battery pack to the device, the fourth battery pack terminal located at the first depth level of the battery pack support portion.

7. The battery pack of claim 5, wherein the battery pack support portion includes a third depth level, the second depth level and the third depth level separated by a second distance.

8. The battery pack of claim 7, further comprising a third battery pack terminal configured to electrically connect the battery pack to the device, the third battery pack terminal located at the third depth level of the battery pack support portion.

9. The battery pack of claim 8, further comprising a fourth battery pack terminal configured to electrically connect the battery pack to the device, the fourth battery pack terminal located at the first depth level of the battery pack support portion.

10. A battery pack comprising:

a housing including a battery pack support portion configured to removably mechanically connect the battery pack to a device, the battery pack support portion including a first depth level and a second depth level, the first depth level and the second depth level separated by a first distance;

a plurality of battery cells located within the housing;

a first battery pack terminal configured to electrically connect the battery pack to the device, the first battery pack terminal located at the first depth level of the battery pack support portion;

a second battery pack terminal configured to electrically connect the battery pack to the device, the second battery pack terminal located at the second depth level of the battery pack support portion; and a third battery pack terminal configured to electrically connect the battery pack to the device, the third battery pack terminal located at the second depth level within the battery pack support portion;

wherein the first battery pack terminal is a battery negative power terminal and the second battery pack terminal is a low power terminal, and the third battery pack terminal is a communication terminal, wherein the first battery pack terminal and the third battery pack terminal are oriented on a first plane, and wherein the second battery pack terminal is oriented on a second plane perpendicular to the first plane.

11. The battery pack of claim 10, further comprising a fourth battery pack terminal configured to electrically connect the battery pack to the device, the fourth battery pack terminal located at the first depth level of the battery pack support portion.

12. The battery pack of claim 10, wherein the battery pack support portion includes a third depth level, the second depth level and the third depth level separated by a second distance.

13. The battery pack of claim 12, further comprising a third battery pack terminal configured to electrically connect the battery pack to the device, the third battery pack terminal located at a third depth level of the battery pack support portion.

14. The battery pack of claim 13, further comprising a fourth battery pack terminal configured to electrically connect the battery pack to the device, the fourth battery pack terminal located at the first depth level of the battery pack support portion.

* * * * *